(12) United States Patent
Takeyoshi et al.

(10) Patent No.: US 7,457,863 B2
(45) Date of Patent: Nov. 25, 2008

(54) HOME AGENT FOR GETTING INFORMATION A LINE USAGE, A CPU USAGE RATE, AND A REGISTERED NODE NUMBER, AND FOR ADJUSTING TRANSMITTING PERIOD FROM A MOBILE NODE

(75) Inventors: Haruyuki Takeyoshi, Kawasaki (JP); Hideaki Ono, Kawasaki (JP); Ryuichi Takechi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1228 days.

(21) Appl. No.: 10/281,570

(22) Filed: Oct. 28, 2002

(65) Prior Publication Data

US 2003/0131047 A1    Jul. 10, 2003

(30) Foreign Application Priority Data

Jan. 9, 2002    (JP)    ............................. 2002-002305

(51) Int. Cl.
*G06F 15/16* (2006.01)
(52) U.S. Cl. .................. 709/224; 370/349; 370/352; 455/435.3
(58) Field of Classification Search ................ 370/338, 370/329, 352, 349; 455/453, 461, 435.3; 709/224, 202
See application file for complete search history.

(56) References Cited

U.S. PATENT DOCUMENTS 7,023,828 B2 *    4/2006    Korus et al. .................. 370/338
7,155,235 B2 *    12/2006    Veerepalli et al. ........... 455/453

(Continued)

FOREIGN PATENT DOCUMENTS

| JP | 5-108848  | 4/1993 |
|----|-----------|--------|
| JP | 05-145472 | 6/1993 |
| JP | 10-91549  | 4/1998 |

(Continued)

OTHER PUBLICATIONS

Notification of Reason(s) for Refusal dated Dec. 12, 2006.

(Continued)

*Primary Examiner*—Jungwon Chang
(74) *Attorney, Agent, or Firm*—Katten Muchin Rosenman LLP

(57) ABSTRACT

In a home agent for designating a transmission period of a binding update packet transmitted from a mobile node, a central processing monitor detects a usage rate of a CPU for processing accompanied by a reception of a binding update packet from the mobile node or a binding renewal message among the binding update packets, a line usage rate monitor detects a line usage rate of a receiving interface accompanied by the processing or a transmitting interface, a BC number monitor detects a binding cache number, and a calculator calculates a transmission period of the binding renewal message of the mobile node based on the thus detected CPU usage rate, line usage rate, binding cache number, and a priority table of the mobile node.

1 Claim, 24 Drawing Sheets

U.S. PATENT DOCUMENTS

| | | | |
|---|---|---|---|
| 2002/0009066 A1* | 1/2002 | Shimizu et al. | 370/338 |
| 2002/0067704 A1* | 6/2002 | Ton | 370/329 |
| 2002/0068588 A1* | 6/2002 | Yoshida et al. | 455/461 |
| 2002/0071417 A1* | 6/2002 | Nakatsugawa et al. | 370/338 |
| 2002/0114323 A1* | 8/2002 | Chowdhury et al. | 370/352 |
| 2003/0026241 A1* | 2/2003 | Ono et al. | 370/349 |

FOREIGN PATENT DOCUMENTS

| | | |
|---|---|---|
| JP | 11-055328 | 2/1999 |
| JP | 11-298945 | 10/1999 |
| JP | 2001-339438 | 12/2001 |

OTHER PUBLICATIONS

Toshiyuki Kanazawa et al. "A study on network architecture for a multimedia communication over IP network" Technical Report of IEICE, vol. 101, No. 121, p. 37-42, Jun. 22, 2001.

David B. Johnson et al. "Mobility Support in IPv6" IETF Mobile IP Working Group Internet Draft, http://www.watersprings.org/pub/id/draft-ietf-mobileip-jpv6-15.txt, Jul. 2, 2001.

* cited by examiner

| HOME ADDRESS | COA | LIFETIME |

RETRIEVAL KEY covers HOME ADDRESS and COA.

| MEMORY NO. | USED/UNUSED FLAG | HOME ADDRESS | COA | LIFETIME(SEC.) |
|---|---|---|---|---|
| 1 | 1 | HA_1 | COA_1 | 30 |
| 2 | 1 | HA_2 | COA_2 | 40 |
| 3 | 0 | | | |
| ⋮ | ⋮ | ⋮ | ⋮ | ⋮ |
| n | . | . | . | . |

18

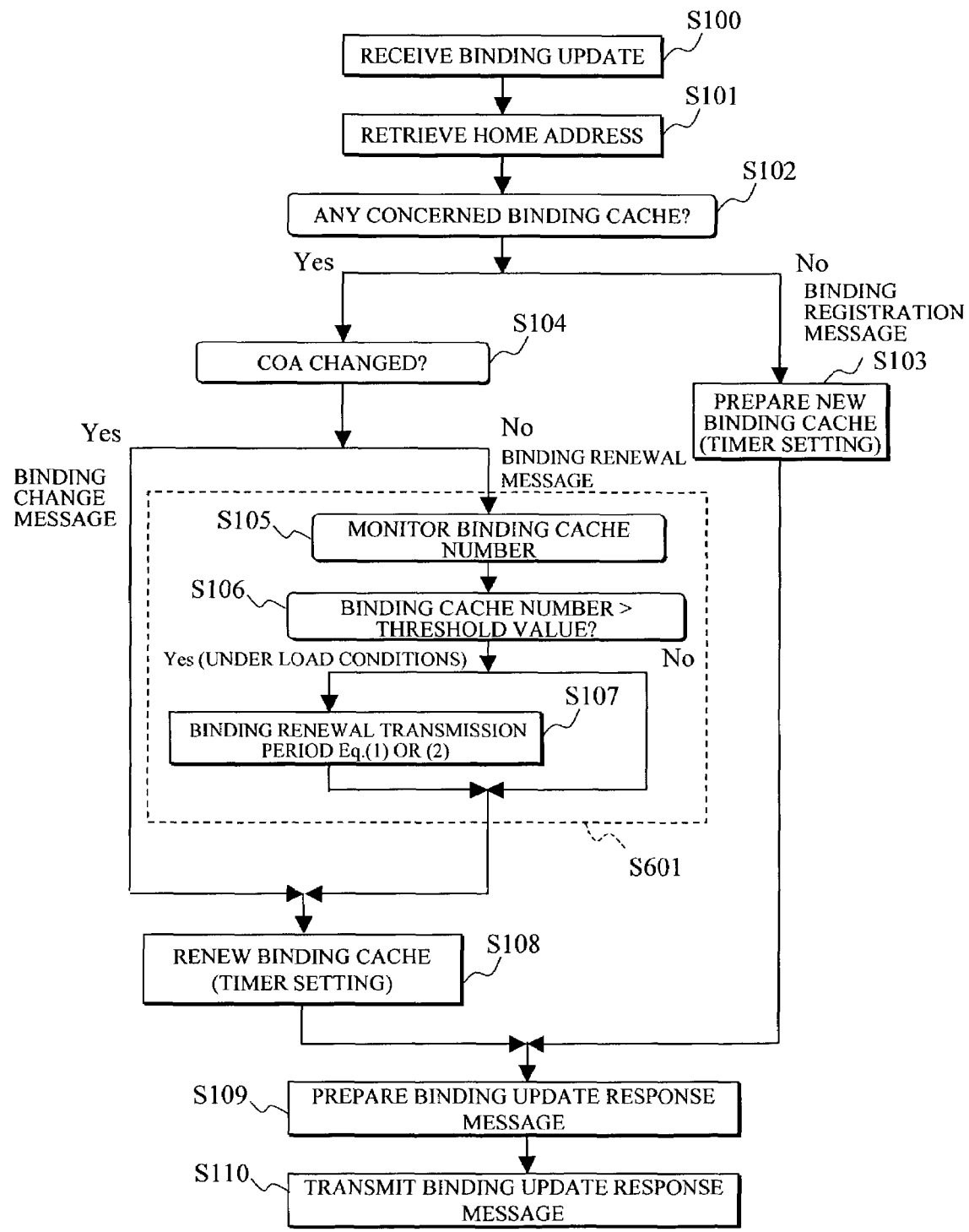

FIG.15A

| HOME ADDRESS | PRIORITY |
|---|---|
| HA_1 | 1 |
| HA_2 | 2 |
| HA_3 | 3 |
| . | . |
| . | . |
| . | . |

FIG.15B

| PRIORITY | BINDING RENEWAL MESSAGE TRANSMISSION PERIOD (SEC.) |
|---|---|
| 1 | 30 |
| 2 | 40 |
| 3 | INFINITE |
| . | . |
| . | . |
| . | . |

HOME AGENT FOR GETTING INFORMATION A LINE USAGE, A CPU USAGE RATE, AND A REGISTERED NODE NUMBER, AND FOR ADJUSTING TRANSMITTING PERIOD FROM A MOBILE NODE

BACKGROUND OF THE INVENTION

1. Field of the Invention

The present invention relates to a home agent, and in particular to a home agent for designating a transmission period of a binding update packet transmitted from a mobile node.

In recent years, accompanied by mobile nodes increasing, Mobile IP has been predominant as a protocol capable of accommodating both of the mobile nodes and fixed nodes and supporting seamless communication of the mobile nodes over an IP network.

In this Mobile IP, the mobile nodes are required to notify Care-of Addresses (hereinafter, occasionally abbreviated as COA's) indicating moving destination addresses to a home agent.

2. Description of the Related Art

FIG. 21 shows a binding registration process in a general mobile IP network 400, which includes a home agent 110, a subordinate mobile node 300, and access routers 201 and 202. The mobile node 300 can be connected to the network 400 through the home agent 110, and the access routers 201 and 202.

The mobile node 300 has a home address of "HA_1", and a packet addressed to the mobile node 300 is transmitted to the home address HA_1.

When moving to a link under the access router 201 from a link (home link) under the home agent 110 along a movement ①, the mobile node 300 receives an advertisement message from the access router 201. If a network address of the access router 201 is different from that of the mobile node 300 itself, the mobile node 300 detects itself having moved, acquires a care-of address COA_1 for the access router 201, and notifies the care-of address COA_1 to the home agent 110 with a binding registration message 801_1.

When receiving the packet addressed to the mobile node 300 (destination address HA_1), the home agent 110 transfers this packet to the access router 201 with the care-of address COA_1. Thus, the packet addressed to the mobile node 300 is delivered to the mobile node 300 through the access router 201.

Furthermore, when moving to a link under the access router 202 along a movement ②, the mobile node 300 similarly notifies a care-of address COA_2 for the access router 202 to the home agent 110 with a binding registration message 801_2. The home agent 110 transfers the received packet addressed to the mobile node 300 to the mobile node 300 through the access router 202.

FIG. 22 shows a format of a header of a general Binding Update packet (hereinafter, occasionally abbreviated as BU packet) indicated in the IETF Internet Draft (draft-ietf-mobileip-ipv6-15.txt).

This header is composed of an IP header and a destination option. The IP header includes a source address field 804a and a destination address field 804b. The destination option includes a home address field 804c of a node.

The format of the BU packet is common to those of the binding registration message, a binding change message, and a binding renewal or update (hereinafter, represented by "renewal") message described later. Hereinafter, the binding registration message, the binding change message, and the binding renewal message may be generally referred to as a binding update packet (hereinafter, occasionally abbreviated as BU packet).

In the source address field 804a, the destination address field 804b, and the home address field 804c of the header of the binding registration message 801_1 shown in FIG. 21, the care-of address COA_1 of the mobile node 300, the address of the home agent 110, and a home agent address of the mobile node 300 are respectively set.

FIG. 23 shows a binding renewal of a mobile node in a general mobile IP network.

The mobile IP network 400 includes the home agent 110, the access routers 201-203, and mobile nodes 301-303 respectively connected to the links of the access routers 201-203.

In the mobile IP network 400, when e.g. the mobile node 301 performs a movement ① as shown in FIG. 21, transmits the binding registration message 801_1 to the home agent 110, and then remains connected to the link of the access router 201 without a movement ②, the mobile node 301 periodically transmits a binding renewal message 802_1 in order to request an extension of a communication time from the home agent 110. In the source address field 804a of the binding renewal message 802_1, the present care-of address COA_1 of the mobile node 301 is set.

The home agent 110 returns a response message 803_1 for the binding renewal message 802_1 to the mobile node 301.

Similarly, while remaining connected to the links of the access routers 202 and 203 respectively, the mobile nodes 302 and 303 periodically transmit binding renewal messages 802_2 and 802_3 to the home agent 110. The home agent 110 returns response messages 803_2 and 803_3 respectively for the binding renewal messages 802_2 and 802_3 to the mobile nodes 302 and 303.

These response messages include a transmission period fixedly set in the binding renewal messages by a manager of the mobile IP network.

Hereafter, each of the mobile nodes transmits the binding renewal messages to the home agent 110 at the received transmission period.

FIG. 24 shows a header format of a general Binding Acknowledgement packet (hereinafter, occasionally abbreviated as BAck packet).

The format of this BAck packet is common to those of response packets from the home agent 110 for the binding registration message, the binding change message, and the binding renewal message transmitted from the mobile node. Hereinafter, the response packets for the binding registration message, the binding change message, and the binding renewal message may be generally referred to as response messages.

The header of the BAck packet is composed of the IP header and a binding acknowledgement sub-option. The IP header includes a source address field 808a and a destination address field 808b in the same way as the header of the binding update packet. The binding acknowledgement sub-option includes a refresh field 808c, in which the above-mentioned fixed transmission period is set.

In such a method by which a prior art home agent transmits a fixed transmission period of a binding renewal message to a mobile node, the mobile node frequently transmits the binding renewal message to the home agent even when the mobile node does not move very often between access routers. This means the increase of the messages within the mobile IP network.

Also, when the scale of the mobile IP network is expanded so that the number of mobile nodes managed by the home agent 110 increases, the binding renewal messages periodically received by the home agent 110 also increase.

Thus, the capacity of the home agent 110 is pressed by reception processing of the binding renewal message, i.e. BU reception processing and BAck transmission processing between the reception of the binding renewal message (BU packet) and the transmission of its response message.

As a result, the following issues arise:
(1) Suspension of other processes under operating conditions, which may secondarily arise by processing load of the binding renewal message reception and the BAck transmission;
(2) Resending of the binding renewal message from the node since the response message for the binding renewal message can not be returned at the time of CPU congestion; and
(3) Further congestion of the mobile IP network by the increase of the number of messages accompanied by (2).

SUMMARY OF THE INVENTION

It is accordingly an object of the present invention to provide a home agent for designating a transmission period of a binding renewal message transmitted from a mobile node, wherein processing load of the binding renewal message in the home agent is reduced, in turn the number of binding renewal messages in a mobile network is reduced.

In order to achieve the above-mentioned object, a home agent according to the present invention comprises: means for getting at least one information of a line usage rate, a CPU usage rate, and a registered node number, and means for adjusting a transmission period of a location renewal message from a mobile node based on the previous information (claim 1).

Namely, a home agent determines a transmission period of a location renewal message (hereinafter, referred to as binding renewal message which is generally used) based on at least one information of a line usage rate, a CPU usage rate, and a registered node number, and notifies the transmission period to the mobile node. The mobile node transmits the binding renewal message to the home agent at the transmission period.

Thus, the home agent can reduce the processing load of the binding renewal message.

Also, a home agent according to the present invention comprises: a binding cache processor for renewing a binding cache associating a home address of a mobile node with a care-of address of a moving destination of the mobile node in absence of a change of a care-of address included in a binding update packet received from the mobile node; a binding renewal transmission period calculator for determining a transmission period of a binding renewal message transmitted by the mobile node based on a binding cache number upon renewal; and a transmitter for transmitting the transmitting period to the mobile node of the care-of address included in the binding update packet (claim 2).

Namely a Binding Cache processor (hereinafter, occasionally abbreviated as BC processor) receives a BU packet from the mobile node.

This BU packet includes a home address of the mobile node and a COA of a moving destination of the mobile node. In the absence of a change in a COA of a binding cache (hereinafter, occasionally abbreviated as BC) associating the home address of the mobile node with the COA of the moving destination of the mobile node, the BC processor renews the BC.

A binding renewal transmission period calculator determines a transmission period of a binding renewal message transmitted to the home agent by the mobile node based on a binding cache number (hereinafter, occasionally abbreviated as BC number) upon renewing the BC.

A transmitter notifies the determined transmission period to the COA included in the BU packet received, i.e. the source mobile node of the BU packet.

Thus, when the BC number increases and the load for processing a binding renewal message from a certain mobile node increases, for example, the home agent can notify the mobile node which transmits the binding renewal message, i.e. the mobile node at rest that the transmission period of the binding renewal message should be extended.

The mobile node transmits the binding renewal message to the home agent at the notified transmission period. Thus, the load of the home agent is reduced, and the number of binding renewal messages transmitted within the mobile IP network can be reduced.

Also, in the present invention according to the above-mentioned invention, the binding renewal transmission period calculator may determine the transmission period when the binding cache number is equal to or more than a predetermined value (claim 3).

Thus, it becomes possible for the calculator to shorten the time for calculating the transmission period and to reduce the load of the calculator.

Also, a home agent according to the present invention comprises: a binding cache processor for renewing a binding cache associating a home address of a mobile node with a care-of address of a moving destination of the mobile node in absence of a change of a care-of address included in a binding update packet received from the mobile node; a central processing unit for performing processing accompanied by a reception of the binding update packet; a central processing monitor for detecting a usage rate of the central processing unit for the processing; a binding renewal transmission period calculator for determining a transmission period of a binding renewal message from the mobile node based on the usage rate of the central processing unit upon renewal; and a transmitter for transmitting the transmission period to the mobile node of the care-of address included in the binding update packet through a transmitting interface (claim 4).

Namely, a BC processor renews a BC associating a home address of a mobile node with a COA of a moving destination of the mobile node in the absence of a change of a COA included in a BU packet received from the mobile node.

A Central Processing Unit (hereinafter, occasionally abbreviated as CPU) performs processing accompanied by a reception of the BU packet from the mobile node, e.g. reception processing of the BU packet, transmission processing of a response message to the BU packet, or the like.

A central processing monitor (hereinafter, occasionally referred to as CPU usage rate monitor) detects a usage rate of the central processing unit (hereinafter, occasionally referred to as CPU usage rate) for the processing accompanied by the reception of the BU packet.

A binding renewal transmission period calculator determines a transmission period of a binding renewal message from the mobile node based on the CPU usage rate upon renewing the BC. A transmitter notifies the determined transmission period to the COA, i.e. the source mobile node, included in the received BU packet.

Thus, when the load of the CPU in the home agent increases, it becomes possible to reduce the number of binding renewal messages transmitted from the mobile node, to reduce the load of the CPU, and to reduce the number of binding renewal messages transmitted within the mobile IP network.

Also, in the present invention according to the above-mentioned invention, the binding renewal transmission period calculator may determine the transmission period when the usage rate of the central processing unit is equal to or more than a predetermined value (claim 5).

Thus, it becomes possible for the calculator to shorten the time for calculating the transmission period and to reduce the load of the calculator.

Also, in the present invention according to the above-mentioned invention, the usage rate of the central processing unit may be for processing accompanied by the reception of the binding renewal message among the binding update packets (claim 6).

Namely, the BU packet is determined to be either the binding registration message, the binding renewal message, or the binding change message according to the contents of the BC. The usage rate of the central processing unit for the processing accompanied by the reception of the binding renewal message among these messages can be made the usage rate of the central processing unit.

Also, a home agent according to the present invention comprises: a receiving interface for receiving a binding update packet from a mobile node; a binding cache processor for renewing a binding cache associating a home address of a mobile node with a care-of address of a moving destination of the mobile node in absence of a change of a care-of address included in the binding update packet received through the receiving interface; a transmitting interface for transmitting a response message accompanied by reception processing of the binding update packet; a line usage rate monitor for detecting a line usage rate of at least one of the receiving interface and the transmitting interface; a binding renewal transmission period calculator for determining a transmission period of a binding renewal message from the mobile node based on the line usage rate upon renewal; and a transmitter for transmitting the transmission period to the mobile node of the care-of address included in the binding update packet through the transmitting interface (claim 7).

Namely, a receiving interface receives a BU packet from a mobile node. A BC processor receives the BU packet through the receiving interface. The BC processor renews a BC associating a home address of the mobile node with a COA of a moving destination of the mobile node in the absence of a change of a COA included in the BU packet.

A line usage rate monitor detects a line usage rate of the receiving interface, a line usage rate of a transmitting interface, or the line usage rates of both interfaces. A binding renewal transmission period calculator determines a transmission period of a binding renewal message from the mobile node based on the line usage rate upon renewal.

A transmitter transmits a response message accompanied by reception processing of the BU packet, e.g. the response message including the determined transmission period to the COA, i.e. the source mobile node, included in the BU packet through the transmitting interface.

Thus, when the BU packet received by the receiving interface increases, the response message accompanied by the reception of the packet transmitted by the transmitting interface increases, or the line usage rate increases by both increases, it becomes possible to reduce the number of binding renewal messages transmitted from the mobile node, and to reduce the load of the receiving interface, the transmitting interface, or the home agent. Furthermore, it becomes possible to reduce the number of binding renewal messages transmitted within the mobile IP network.

Also, in the present invention according to the above-mentioned invention, the binding renewal transmission period calculator may determine the transmission period when the line usage rate is equal to or more than a predetermined value (claim 8).

Thus, it becomes possible to shorten the time for calculating the transmission period by the calculator, and to reduce the load of the calculator.

Also, a home agent according to the present invention comprises: a binding cache processor for renewing a binding cache associating a home address of a mobile node with a care-of address of a moving destination of the mobile node in absence of a change of a care-of address included in a binding update packet received from the mobile node; a priority table associating a priority of the mobile node with a transmission period of a binding renewal message transmitted from the mobile node; a binding renewal transmission period calculator for determining the transmission period based on the priority table upon renewal; and a transmitter for transmitting the transmission period to the mobile node of the care-of address included in the binding update packet (claim 9).

Namely, a priority table associates a priority of the mobile node with a transmission period of a binding renewal message transmitted from the mobile node to be held.

A BC processor receives a BU packet from the mobile node. This BU packet includes a home address of the mobile node and a COA of a moving destination of this mobile node. The BC processor renews the BC in the absence of a change of a COA of the BC associating the home address of the mobile node with the COA of the moving destination of the mobile node.

Upon renewal, a binding renewal transmission period calculator determines the transmission period of the binding renewal message of the mobile node based on the priority table. A transmitter notifies the determined transmission period to the COA, i.e. the source mobile node, of the BU packet received.

Thus, it becomes possible for the home agent to designate for the mobile node the transmission period of the binding renewal message corresponding to the priority of the mobile node, and to distribute the processing load of the binding renewal message according to the priority of the mobile node.

Also, in the present invention according to the above-mentioned invention, a lifetime of the binding cache may be associated with the binding cache itself, and the binding cache processor may renew the lifetime of the binding cache with a value larger than the transmission period upon renewal (claim 10).

Thus, the BC is prevented from being deleted before being renewed by the binding renewal message from the corresponding mobile node.

Also, a home agent according to the present invention comprises: one or more functional portions of; a central processing unit for performing processing accompanied by a reception of a binding update packet from a mobile node, and a central processing monitor for detecting a usage rate of the central processing unit for the processing, a receiving interface for receiving the binding update packet, a transmitting interface for transmitting a response message associated with the reception processing of the binding update packet, and a line usage rate monitor for detecting a line usage rate of at least one of the receiving interface and the transmitting interface, and a priority table associating a priority of the mobile node with a transmission period of a binding renewal message transmitted from the mobile node; a binding cache processor for renewing a binding cache associating a home address of the mobile node with a care-of address of a moving destination of the mobile node in absence of a change of a care-of address included in the binding update packet; a binding renewal transmission period calculator for determining the transmission period of the binding renewal message transmitted by the mobile node based on at least two or more information of a binding cache number, the usage rate of the central processing unit, the line usage rate, and the priority; and a transmitter for transmitting the transmission period to the mobile node of the care-of address included in the received packet (claim 11).

Namely, a home agent is provided with e.g. a central processing unit, a central processing monitor, a BC processor, a binding renewal transmission period calculator, and a transmitter.

A BC processor renews a BC associating a home address of the mobile node with a COA of a moving destination of the mobile node in the absence of a change of a COA included in the BU packet from the mobile node.

The central processing unit performs processing accompanied by a reception of the BU packet. The central processing monitor detects the usage rate (CPU usage rate) of the central processing unit for the processing.

The binding renewal transmission period calculator determines the transmission period of the binding renewal message transmitted by the mobile node based on the BC number and CPU usage rate upon renewal.

A transmitter transmits the transmission period to the mobile node of the COA included in the received packet.

Thus, it becomes possible for the home agent to reduce the number of binding renewal messages transmitted from the mobile node, and to reduce its load based on at least two or more of the BC number, the CPU usage rate, the line usage rate, and the priority. Furthermore, it becomes possible to reduce the number of binding renewal messages transmitted within the mobile IP network.

BRIEF DESCRIPTION OF THE DRAWINGS

The above and other objects and advantages of the invention will be apparent upon consideration of the following detailed description, taken in conjunction with the accompanying drawings, in which the reference numbers refer to like parts throughout and in which:

FIG. 3 is a flow chart showing an operation sequence in an embodiment (1) of a home agent according to the present invention;

FIGS. 15A and 15B are diagrams showing format examples of tables in an embodiment (4) of a home agent according to the present invention;

DESCRIPTION OF THE EMBODIMENTS

Embodiment (1)

Determination of Transmission Period Based on BC Number

In an embodiment (1), a home agent determines a transmission period of a binding renewal message based on a BC number to be notified to a mobile node.

Figure 1:
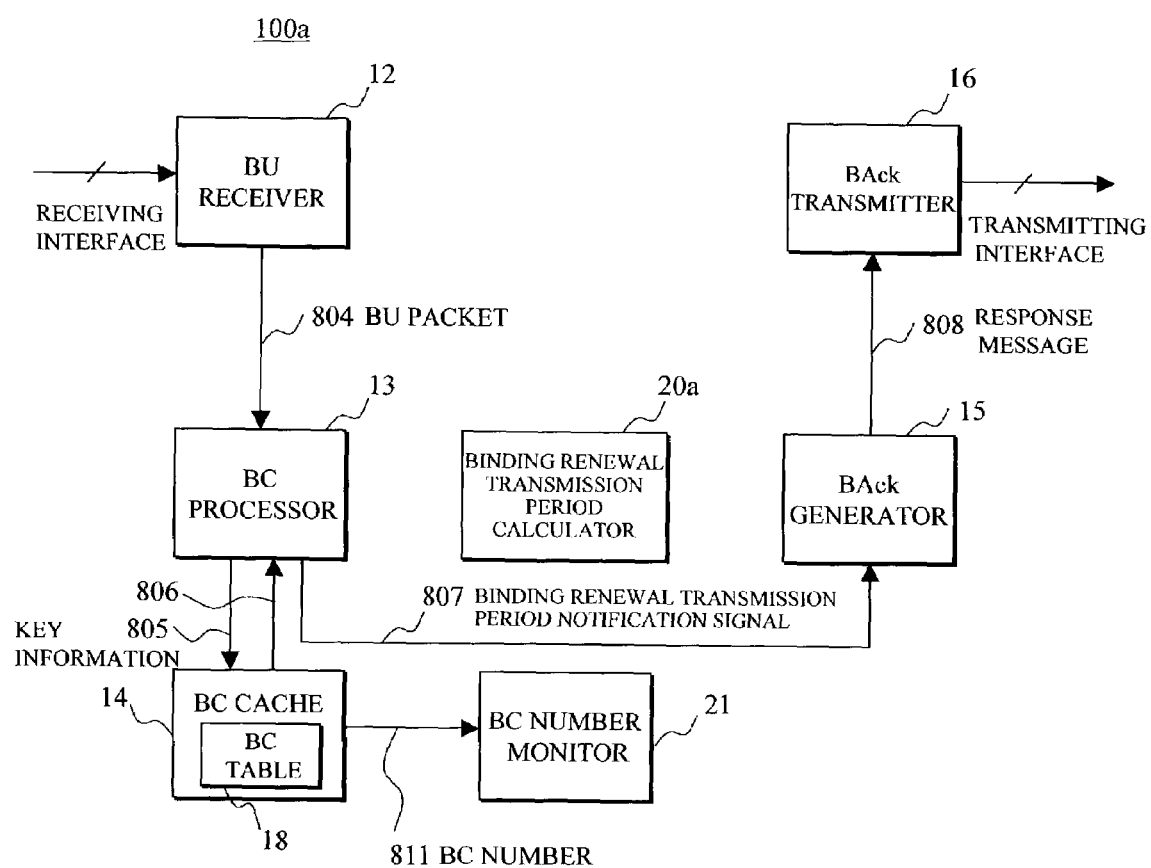
FIG. 1 is a block diagram showing an arrangement of an embodiment (1) of a home agent according to the present invention and an operation in a case where "BC number"<"threshold value"

FIG. 1 shows an arrangement of the embodiment (1) of a home agent 100a according to the present invention. Also, FIG. 1 shows an operation, i.e. signals transmitted/received between functional portions, of the home agent 100a when the "BC number" is equal to or less than a "threshold value", where connecting lines between the functional portions are omitted. It is to be noted that the "threshold value" may be set by a manager.

The home agent 100a is composed of a BU receiver 12, a BC processor 13, a BC cache 14, a BAck generator 15, a BAck transmitter 16, a BC number monitor 21, and a binding renewal transmission period calculator 20a. The BC cache 14 includes a BC table 18.

Figures 2A, 2B:
FIGS. 2A and 2B are diagrams showing a BC table example in a home agent according to the present invention.

FIGS. 2A and 2B show an arrangement of the BC table 18. FIG. 2A shows a BC registered in the BC table 18, which is composed of a "home address", a "COA", and a "lifetime" of a mobile node.

FIG. 2B shows the BC table 18, which is composed of a "memory No. field", a "used/unused field", a "home address field", a "COA field", and a "lifetime field". The BC in FIG. 2A is registered or renewed in the "home address field", the "COA field", and the "lifetime field" within the above-mentioned fields.

The BC table 18 indicates that the mobile nodes used at present are ones whose home addresses are HA_1 and HA_2, and whose care-of addresses of the moving destination and lifetimes are respectively "COA_1", "COA_2", "30 sec.", and "40 sec.".

The "lifetime" indicates the lifetime of the BC registered in the BC table 18. The BC whose lifetime has elapsed after a registration or a renewal is deleted from the BC table 18.

Figure 4:
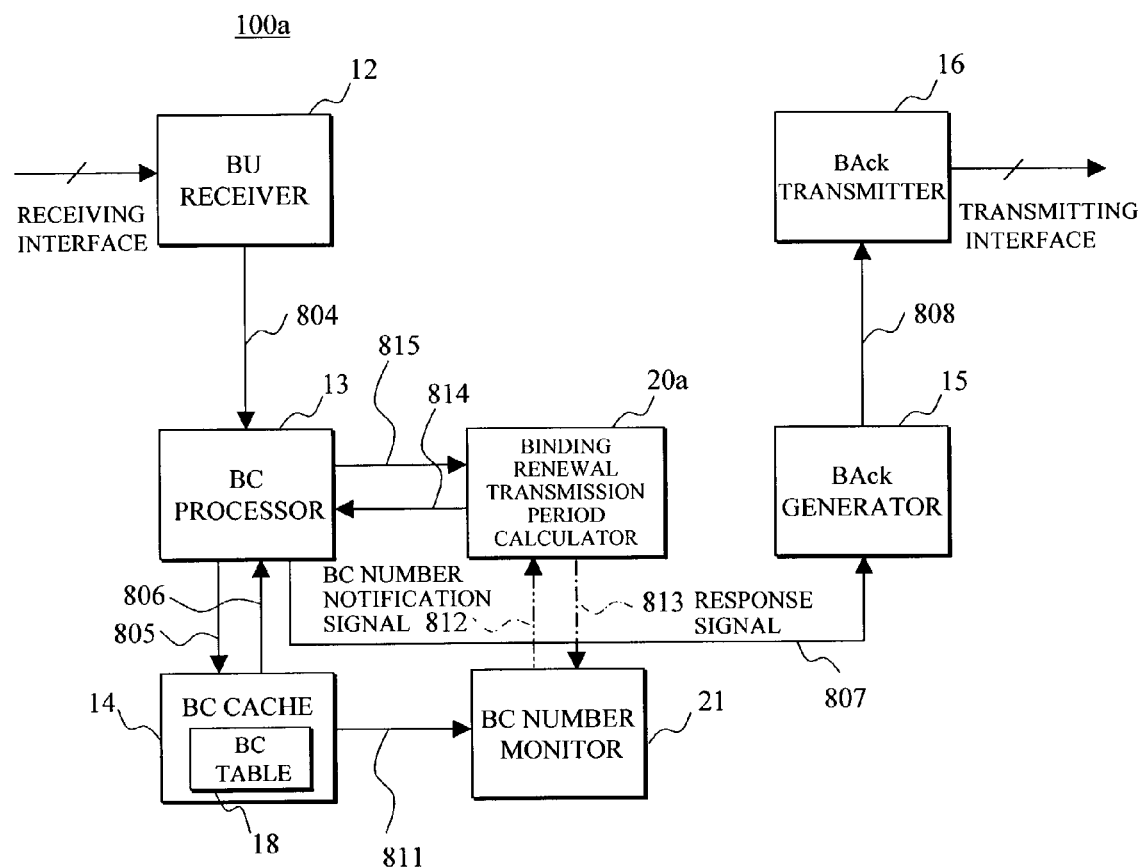
FIG. 4 is a block diagram showing an operation in a case where "BC number">"threshold value" in an embodiment (1) of a home agent according to the present invention.
Figure 5:
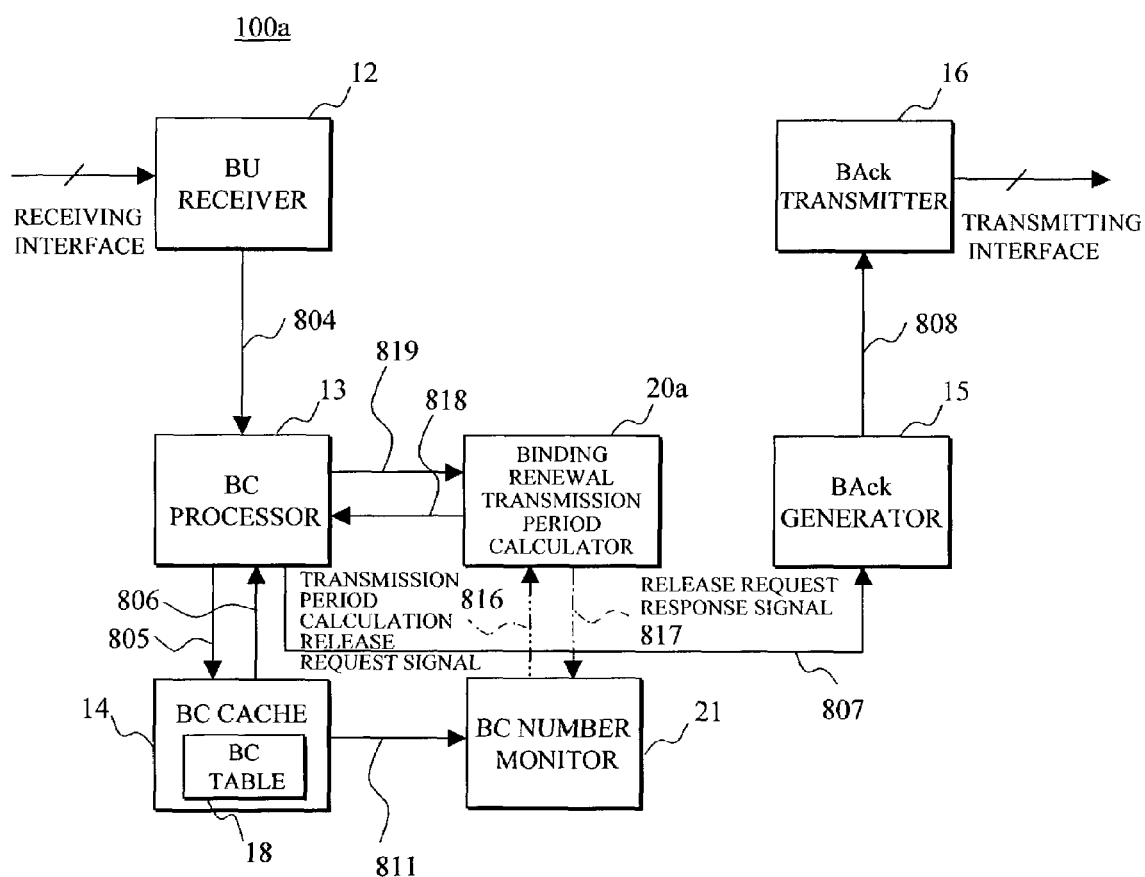
FIG. 5 is a block diagram showing an operation when a state has returned to a case where "BC number"<"threshold value" in an embodiment (1) of a home agent according to the present invention.

FIG. 3 shows an operation sequence in the embodiment (1). FIGS. 4 and 5 respectively show an operation in a case where "BC number">"threshold value" and an operation when the state has returned to a case where "BC number"<"threshold value".

Hereinafter, the operation sequence of FIG. 3 will be described referring to FIGS. 1, 4, and 5.

Firstly, the case where a BU packet is a binding registration message will be described.

Figure 22:
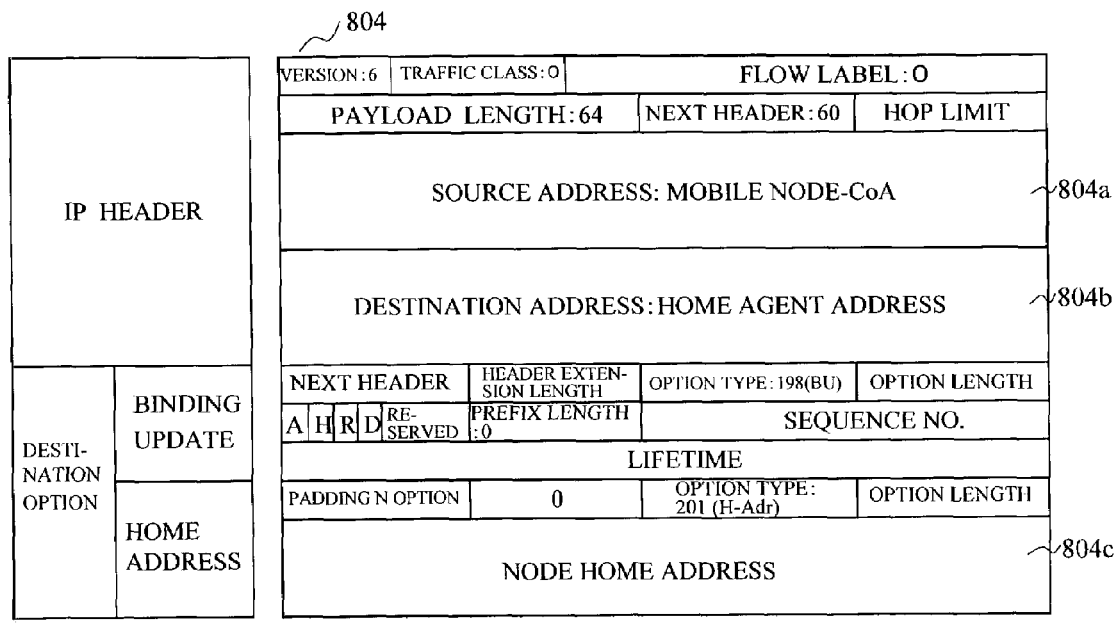
FIG. 22 is a diagram showing a format of a general binding update packet.
Figure 23:
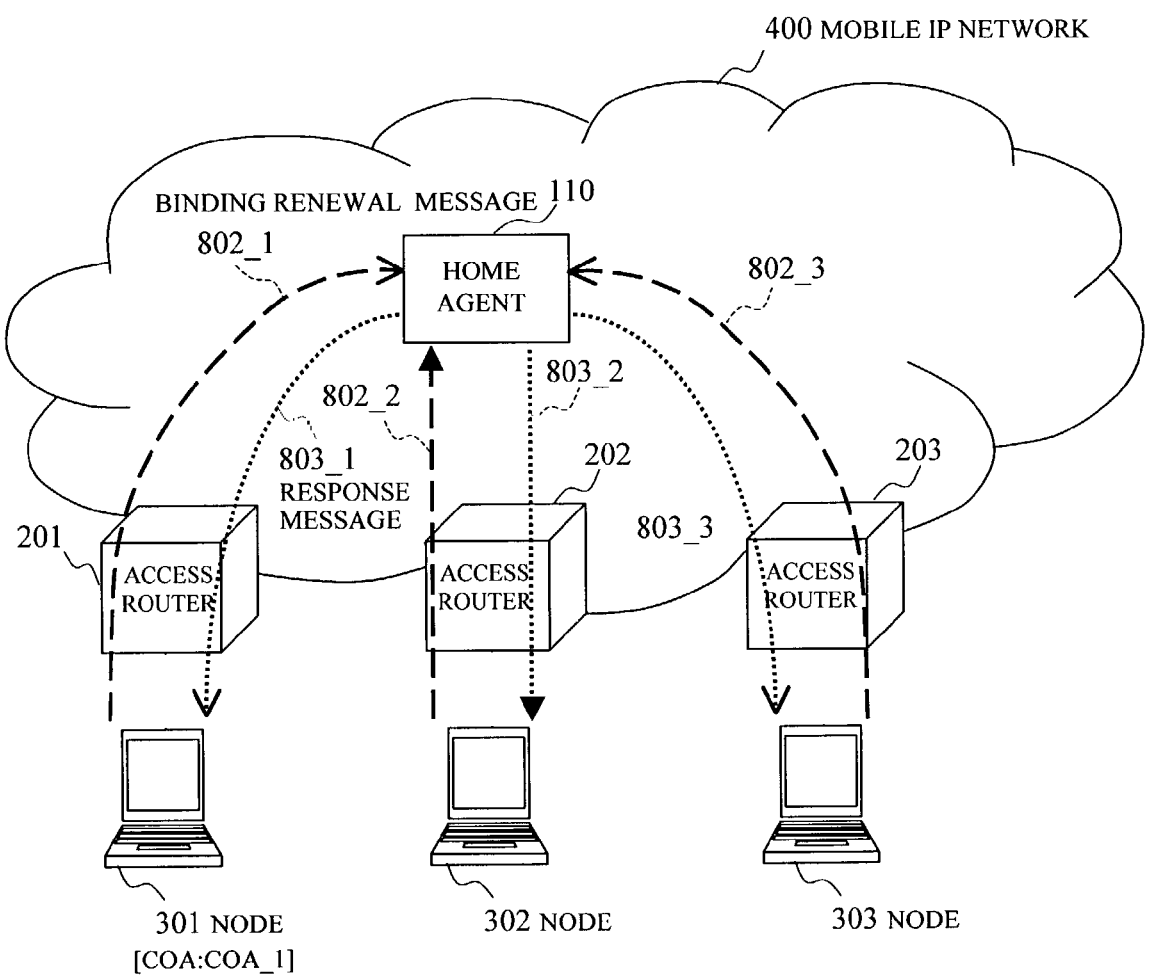
FIG. 23 is a block diagram showing a binding renewal in a general mobile IP network.

Step S100: The BU receiver 12 receives a BU packet 804. As having been shown in FIG. 22, in the source address field and the destination address field of the header portion of the BU packet 804, the COA of the mobile node and the address of the home agent 100a are respectively set.

Also, in the destination option, an option type="198" (BU) indicating a binding update is set.

The BU receiver 12 detects a packet whose option type="198" as the BU packet 804 to be provided to the BC processor 13 (see FIG. 1).

Steps S101 and S102: In the BU packet (see FIG. 22), "201" is set in the "option type" within the home address (destination option) field. This setting indicates that a field 804c is the "node home address". The case where e.g. "HA_3" is set in the "node home address" will now be described.

The BC processor 13 provides key information 805 including the "HA_3" to the BC cache 14, and requests the BC cache 14 to retrieve the data (BC) of the "HA_3" in the BC table 18 (see FIG. 2B). Since the concerned BC is not registered in the BC table 18, the BC cache 14 returns a response signal 806 indicating that the BC is not registered, to the BC processor 13. Thus, the BC processor 13 recognizes that the BU packet is a binding registration message.

Step S103: The BC processor 13 generates a new BC to be registered in the BC table 18. The home address, the COA, and the lifetime of this BC are respectively made the "HA_3", the source address of the BU packet 804, e.g. a "COA_3", and a predetermined system setting value set by a manager, e.g. "30 sec.".

It is to be noted that this lifetime is decremented with a lapse of time after setting, and that the BC is deleted from the BC table 18 when the lifetime="0 sec.". Namely, the lifetime field also serves as a timer.

Furthermore, the BC processor 13 notifies a transmission period="24 sec." in which predetermined weights, e.g. "0.8" are assigned to a predetermined specified value="30 sec." to the BAck generator 15 with a binding renewal transmission period notification signal 807. This weighting enables the mobile node to transmit the BU packet (binding renewal message) to the home agent 100a before the BC corresponding to the mobile node itself is deleted from the BC table 18, and perform a binding renewal (renewal of the BC table 18).

Figure 24:
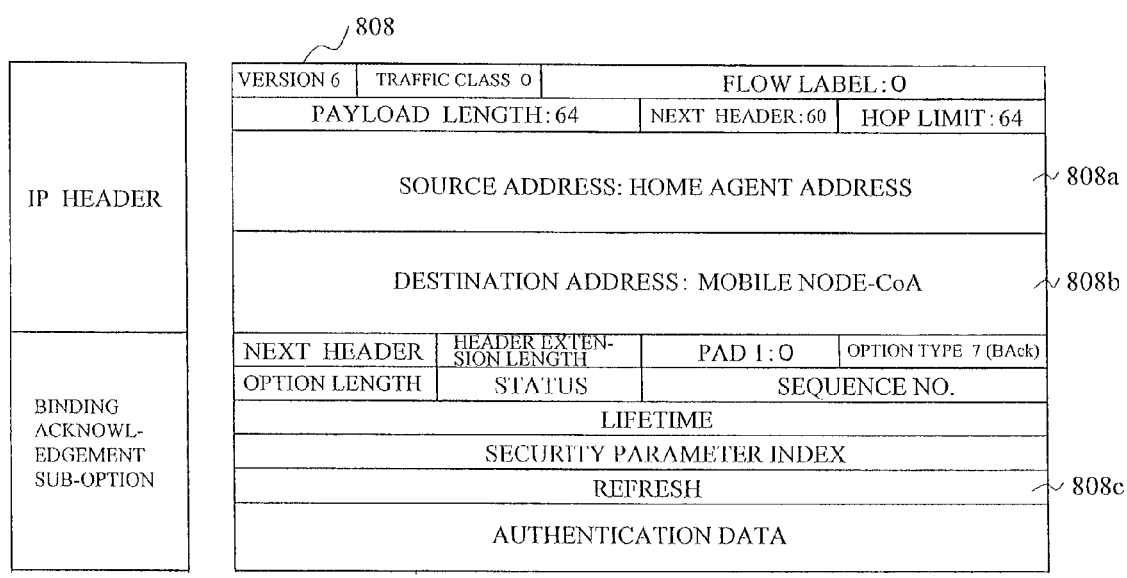
FIG. 24 is a diagram showing a format of a general binding acknowledgment packet.

Steps S109 and S110: The BAck generator 15 generates a response message (response message for a binding registration message) 808 where the home address, the care-of address="COA_3", and the transmission period="24 sec." are respectively set in the source address field 808a, the destination address field 808b, and the refresh field 808c of the BAck packet shown in FIG. 24. The generated response message is provided to the BAck transmitter 16, which transmits the response message 808 from a transmitting interface.

Hereinafter, a case where the BU packet 804 is a binding change message, e.g. the "source address" of the BU packet 804="COA_4" and the "node home address"="HA_1" will be described.

Steps S102 and S104: The BC processor 13 provides the key information 805 including the "HA_1" to the BC cache 14, which returns to the BC processor 13 the response signal 806 including the care-of address "COA_1" corresponding to the home address "HA_1" registered in the BC table 18. Since the responded care-of address "COA_1" is different from the source address "COA_4", namely the COA is changed, the BC processor 13 determines that the source mobile node has moved to another access node.

Namely, the BC processor 13 determines that the mobile node has transmitted the BU packet (binding change message) indicating the movement of the mobile node itself.

Step S108: The BC processor 13 renews the COA and the lifetime corresponding to the home address "HA_1" in the BC table 18 respectively to the "COA_4" and the system setting value "30 sec.".

Then, the BC processor 13 determines the transmission period "24 sec.", in the same way as step S103, to be provided to the BAck generator 15.

Steps S109 and S110: The BAck generator 15 generates the response message 808 in which the transmission period="24 sec." is set. The BAck transmitter 16 transmits the response message 808.

Also, the case where the BU packet 804 is a binding renewal message, e.g. the "source address" and the "node home address" of the BU packet 804 are respectively "COA_1" and "HA_1", will now be described.

Steps S102 and S104: In FIG. 4, the BC processor 13 provides the key information 805 including the node home address "HA_1" within the received BU packet 804 to the BC cache 14. The BC cache 14 refers to the BC table 18 (see FIG. 2B) and returns the care-of address "COA_1" corresponding to the "HA_1" by the response signal 806.

Since the source address "COA_1" of the BU packet 804 is equal to the care-of address "COA_1" of the registered BC, namely the COA is not changed, the BC processor 13 recognizes that the BU packet 804 is a binding renewal message.

Namely, the BC processor 13 determines that the mobile node has not moved within the mobile IP network and periodically transmits the BU packet (binding renewal message) 804 to the BC processor 13 in order to continue the communication.

Steps S105 and S106: In FIG. 4, the BC number monitor 21 monitors a BC number 811 registered in the BC table 18. When the BC number 811 exceeds a predetermined "threshold value", the BC number monitor 21 notifies the fact to the binding renewal transmission period calculator 20a with a BC number notification signal 812.

Step S107: Upon receiving the notification, the binding renewal transmission period calculator 20a starts, and returns a response signal 813 to the BC number monitor 21. On the other hand, every time the BC is renewed, the BC processor 13 notifies the BC renewal state to the binding renewal transmission period calculator 20a with a signal 815. The binding renewal transmission period calculator 20a having received the signal 815 calculates the value of the transmission period of the binding renewal message instructed to the node based on the BC number notified from the BC number monitor by the following Equation (1).

$$\text{Transmission period} = \text{Management setting value} \times \frac{1}{1 - BC\ \text{number} / BC\ \text{settable maximum value}} \quad \text{Eq. (1)}$$

It is to be noted that this Eq.(1) may be used for a high-speed retrieval when the BC is stored in a primary memory, and that the following Equation (2) may be used for calculating a transmission period when the BC is stored in a secondary memory.

$$\text{Transmission period} = \text{Management setting value} \times \frac{1}{1 - BC\ \text{number} / (\text{maximum management setting value})} \quad \text{Eq. (2)}$$

Step S108: The calculator 20a provides the calculated transmission period=e.g. "50 sec." to the BC processor 13 with a transmission period signal 814. The BC processor 13 provides e.g. "60 sec." in which the transmission period="50 sec." is weighted, and "HA__1" to the BC cache 14 with the signal 805.

The BC cache 14 renews the timer of the lifetime field of the home address "HA__1" in the BC table 18 to "60 sec.". Furthermore, the BC processor 13 provides the binding renewal transmission period notification signal 807 including the transmission period="50 sec." to the BAck generator 15.

Steps S109 and S110: The BAck generator 15 receives the transmission period="50 sec." with the binding renewal transmission period notification signal 807, and generates the response message 808 (see FIG. 24) in which the transmission period="50 sec." is set in the refresh field 808c. The BAck transmitter 16 transmits the response message 808.

The mobile node transmits the BU packet (binding renewal message) to the home agent 100a at the transmission period="50 sec." included in the received response message 808.

Accordingly, when the BC (binding cache) number registered in the BC table 18 increases, and load for processing the binding renewal message from the mobile node corresponding to the BC increases, it becomes possible for the home agent 100a to extend the transmission period of the binding renewal message (to reduce the number of binding renewal messages transmitted) for the mobile node which transmits the binding renewal message.

Steps S105 and S106: In FIG. 5, when the BC number 811 is less than a specified threshold value, the BC number monitor 21 provides a transmission period calculation release request signal 816 to the binding renewal transmission period calculator 20a.

The calculator 20a returns a release request response signal 817 to the BC number monitor 21, and stops the calculation of the transmission period.

Furthermore, the calculator 20a notifies the stop of the transmission period calculation to the BC processor 13 with a calculation stop notification signal 818, so that the BC processor 13 returns a response signal 819.

Step S108: The BC processor 13 renews the lifetime of the BC to a predetermined system setting value=e.g. "30 sec.", and notifies the transmission period="24 sec." to the BAck generator 15 with the binding renewal transmission period notification signal 807.

Steps S109 and S110: The BAck generator generates the response message 808. The BAck transmitter 16 transmits the response message 808.

The mobile node transmits the BU packet (binding renewal message) to the home agent 100a at the transmission period="24 sec." included in the received response message 808.

Thus, it becomes possible for the home agent 100a to instruct the mobile node which transmits the binding renewal message to restore a usual specified value for the transmission period of the binding renewal message, when the BC number registered in the BC table 18, and the load for processing the binding renewal message from the mobile node corresponding to the BC are reduced.

Hereafter, the home agent 100a returns to the operation shown in FIG. 1, and repeats the operation of FIG. 1→FIG. 4→FIG. 5, thereby suppressing the load state by the calculation of the binding renewal message transmission period.

Embodiment (2)

Determination of Transmission Period Based on CPU Usage Rate

Figure 6:
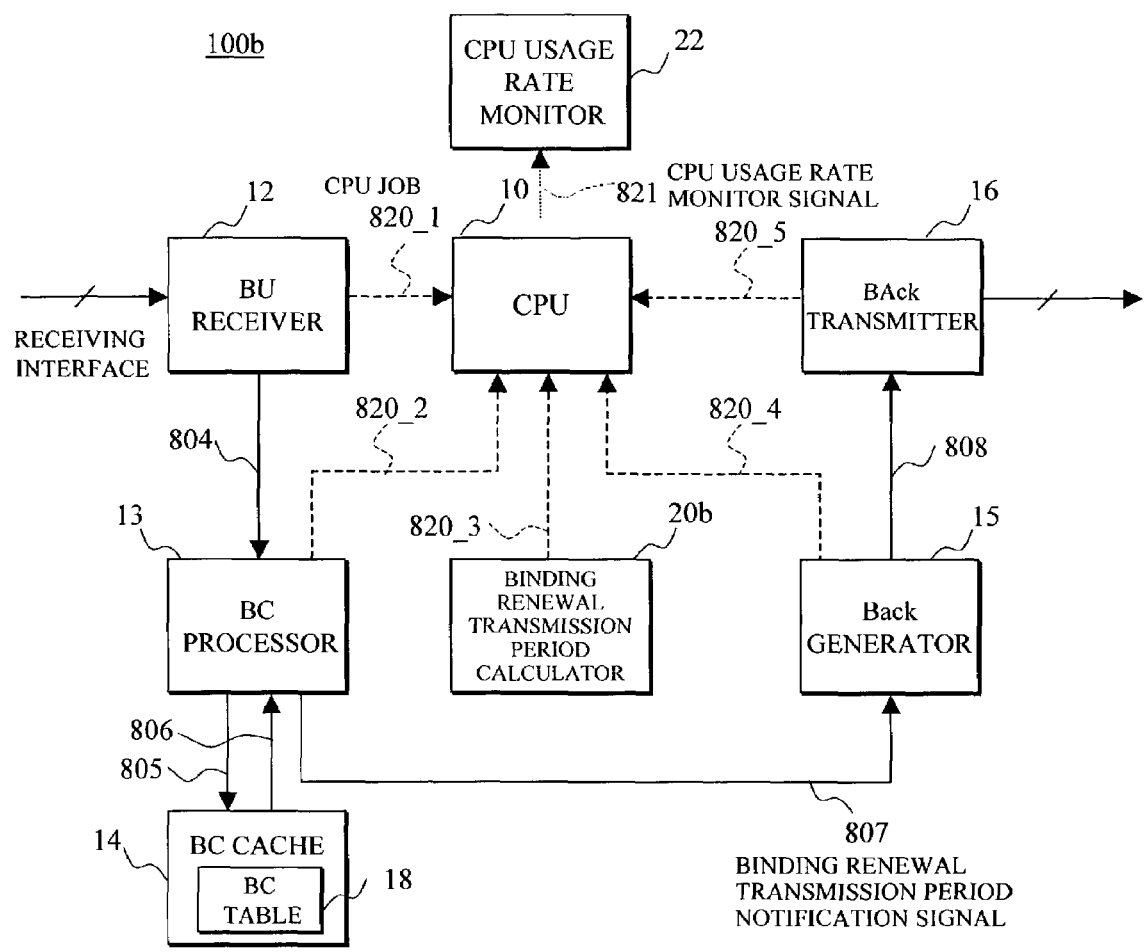
FIG. 6 is a block diagram showing an arrangement of an embodiment (2) of a home agent according to the present invention and an operation in a case where "CPU usage rate"<"threshold value"

FIG. 6 shows an arrangement of an embodiment (2) of a home agent 100b according to the present invention, and signals transmitted/received between functional portions of the home agent 100b in case "CPU usage rate"<"predetermined threshold value", where connecting lines between the functional portions are omitted.

In this embodiment (2), the home agent 100b determines the transmission period of the binding renewal message based on the CPU usage rate for the reception processing of the BU packet, and notifies the transmission period to the mobile node.

It is to be noted that the transmission period may be determined by the CPU usage rate for the reception processing only of the binding renewal message among the BU packets.

The home agent 100b is different from the home agent 100a shown in FIG. 1 in that the BC number monitor 21 is not provided, a CPU usage rate monitor 22 is added, and a binding renewal transmission period calculator 20b is substituted for the binding renewal transmission period calculator 20a.

A CPU 10 shown in FIG. 6 processes jobs 820_1-820_5 of the BU receiver 12, the BC processor 13, the calculator 20b, the BAck generator 15, and the BAck transmitter 16 respectively. It is to be noted that although the CPU 10 is also included in FIG. 1, it is omitted in FIG. 1 for convenience sake.

Figure 7:
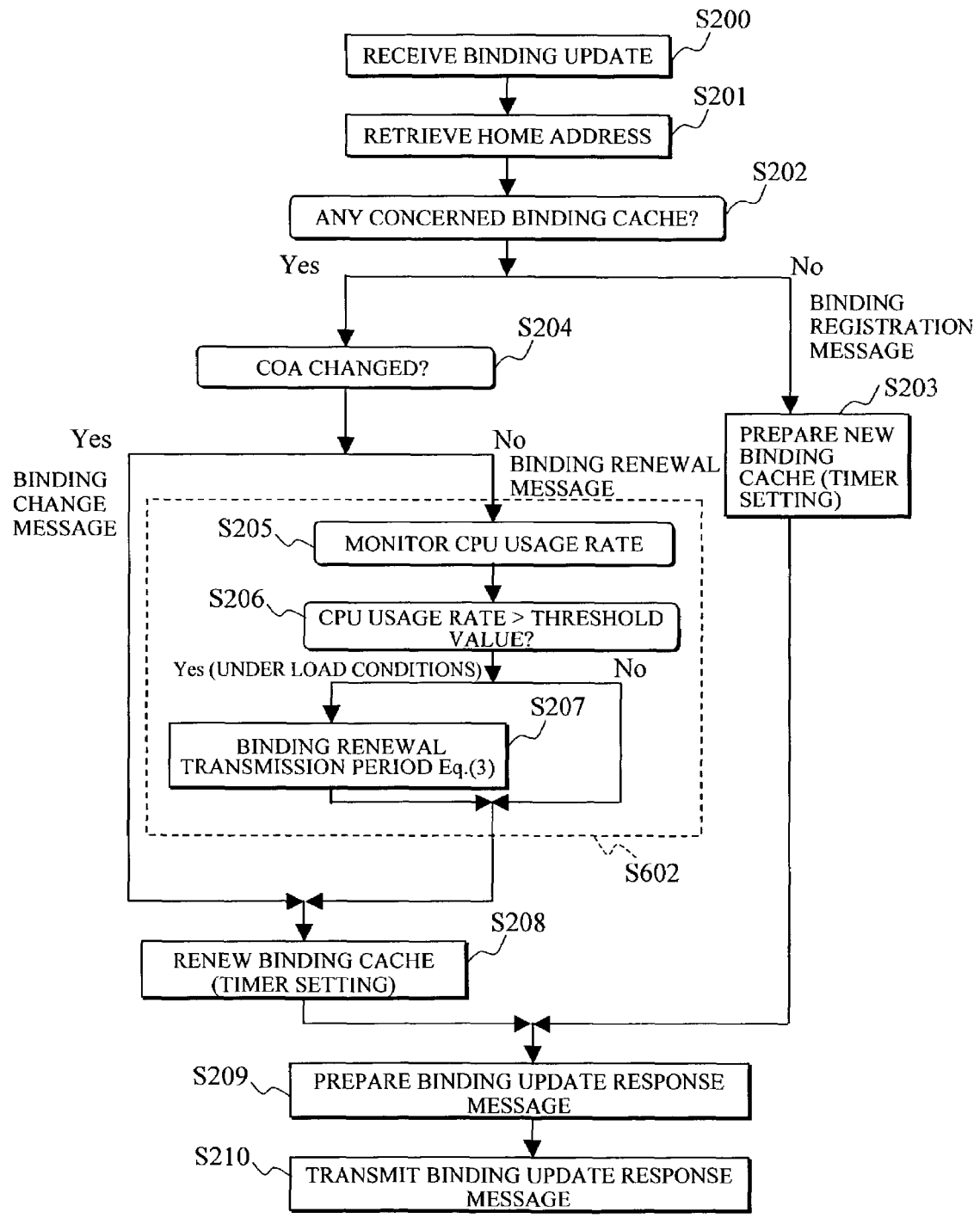
FIG. 7 is a flow chart showing an operation sequence in an embodiment (2) of a home agent according to the present invention.
Figure 8:
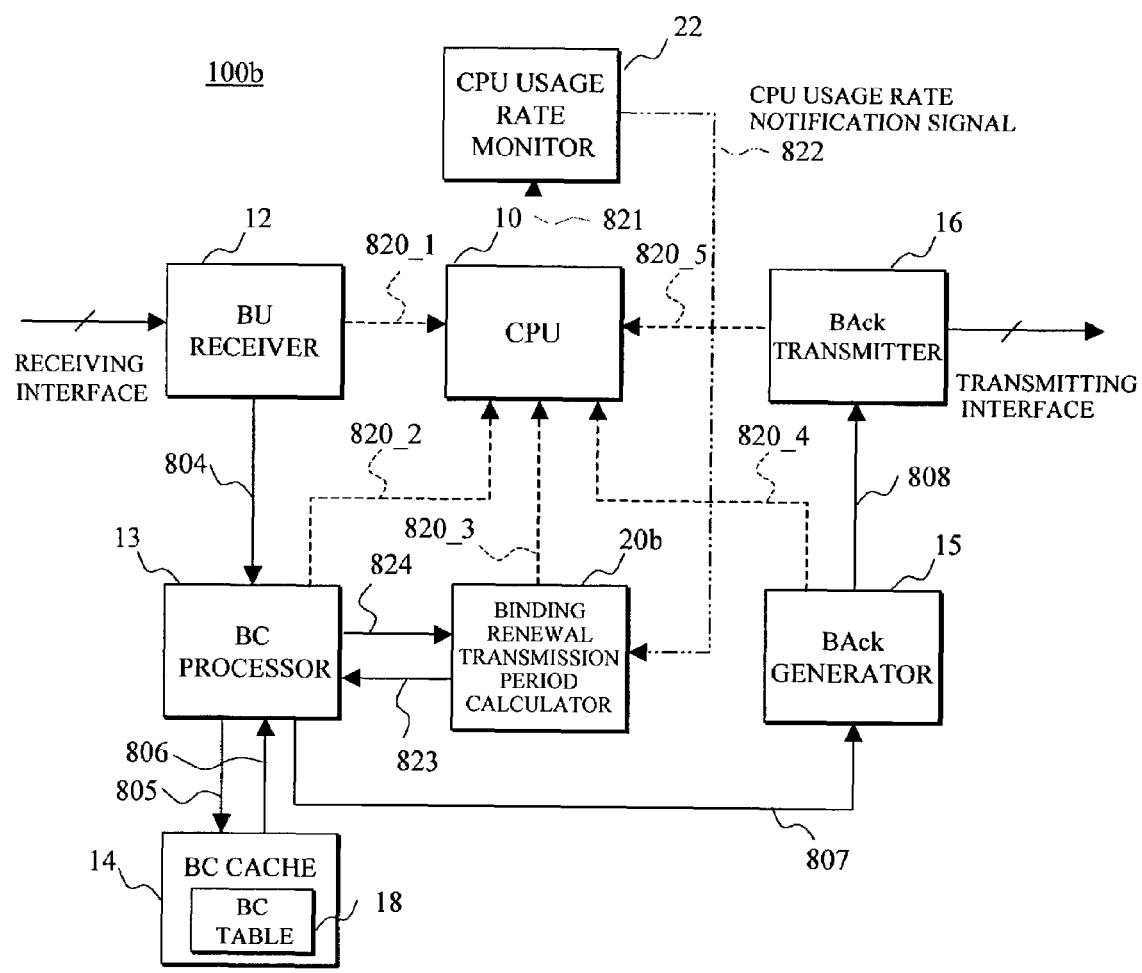
FIG. 8 is a block diagram showing an operation in a case where "CPU usage rate">"threshold value" in an embodiment (2) of a home agent according to the present invention.
Figure 9:
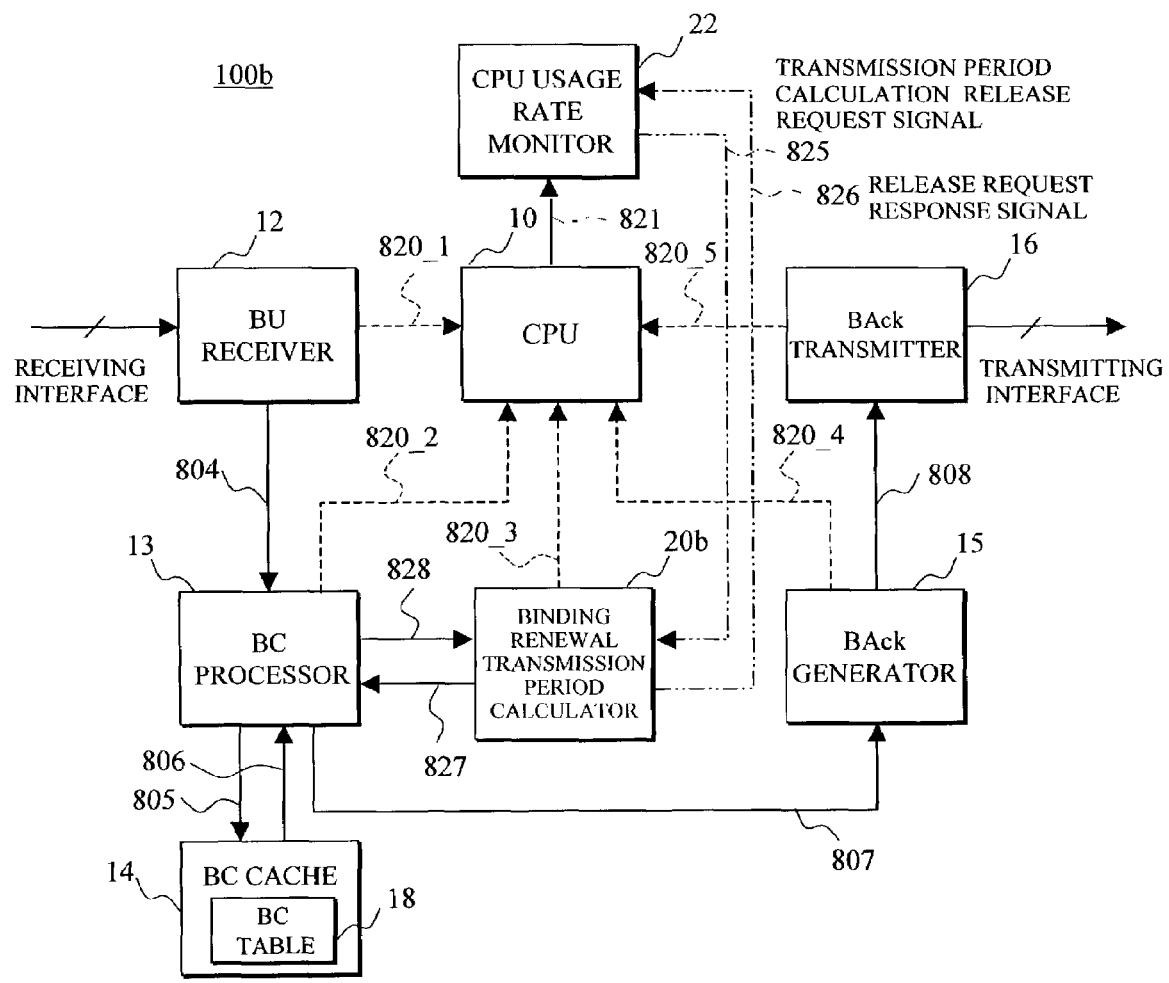
FIG. 9 is a block diagram showing an operation when a state has returned to a case where "CPU usage rate"<"threshold value" in an embodiment (2) of a home agent according to the present invention.

FIG. 7 shows an operation sequence of the embodiment (2). FIGS. 8 and 9 respectively show an operation in the case where "CPU usage rate">"predetermined threshold value" and an operation in the restored state where "CPU usage rate"<"predetermined threshold value".

The operation sequence in FIG. 7 will now be described referring to FIGS. 6, 8, and 9.

First, the case where the BU packet is the binding registration message will be described.

Steps S200-S203, S209, and S210: The operation of these steps is the same as steps S100-S103, S109, and S110 in FIG. 3. Different from FIG. 3, the CPU usage rate monitor 22 monitors, instead of the BC number, the usage rate of the CPU 10 for the jobs 820_1-820_5 corresponding to the received BU packet.

These jobs 820_1-820_5 include, after the reception of the BU packet, the processing accompanied by the reception, e.g. the generation and the transmission processing of the response message for the BU packet.

The home agent 100b registers the BC (lifetime=a predetermined system setting value "30 sec.") of the source mobile node of the binding registration message in the BC table 18. Furthermore, the home agent 100b returns the response message including the transmission period="24 sec." to the mobile node.

Hereinafter, the case where the BU packet is a binding change message will be described.

Steps S202, S204, and S208-S210: The operation of these steps is the same as steps S102, S104, and S108-S110 of FIG. 3 except that the CPU usage rate monitor 22 monitors the usage rate of the CPU 10 for the jobs 820_1-820_5.

The home agent 100b renews the lifetime of the BC corresponding to the source mobile node of the BU packet (binding renewal message) registered in the BC table 18 to a predetermined system setting value="30 sec.". Furthermore, the home agent 100b returns the response message including e.g. the transmission period="24 sec." to the mobile node.

Furthermore, the case where the BU packet is the binding renewal message will now be described.

Steps S202, and S204-S210: These steps show the operation in the case where "CPU usage rate">"predetermined threshold value". The basic operation is the same as steps S102, and S104-S110 of FIG. 3. In FIG. 8, the CPU usage rate monitor 22 notifies that "CPU usage rate" >"predetermined threshold value" and the CPU usage rate to the binding renewal transmission period calculator 20b with a CPU usage rate notification signal 822 to start the calculator 20b.

On the other hand, every time the BC is renewed, the BC processor 13 notifies that the BC is in the renewal state to the calculator 20b with a signal 824. The calculator 20b calculates the value of the "transmission period" of the binding renewal message from the mobile node based on the "CPU usage rate" by the following Equation (3) triggered with the reception of the signal 824.

$$\text{Transmission period} = \text{Default value} \times \frac{1}{1 - CPU \text{ usage rate}/100} \quad \text{Eq. (3)}$$

In this Eq.(3), the CPU usage rate by the BU reception processing is expressed in %.

The calculator 20b provides the calculated "transmission period" to the BC processor 13 with a signal 823. The BC processor 13 renews the lifetime (timer) of the BC stored in the BC table 18 after the "transmission period" is weighted, and notifies "the transmission period" of the binding renewal message to the BAck generator 15.

The BAck generator 15 generates the response message 808 including the "transmission period". The BAck transmitter 16 transmits the response message through the transmitting interface.

Thus, the CPU10 can reduce the load by extending the period in which the mobile node transmits the binding renewal message, when the load accompanied by the reception processing of the binding renewal message increases.

Steps S204-S206 and S208-S210: When the operation has returned to a case where "CPU usage rate"<"predetermined threshold value" in FIG. 9, the CPU usage rate monitor 22 requests the calculator 20b to release the calculation of the transmission period with a transmission period calculation release request signal 825. The calculator 20b stops the calculation of the transmission period, and returns a release request response signal 826.

Furthermore, the calculator 20b notifies the stop of the transmission period calculation to the BC processor 13 with a calculation stop notification signal 827, and the BC processor 13 returns a response signal 828.

Then, the lifetime of the BC in the BC table 18 corresponding to the mobile node which has transmitted the binding renewal message is renewed to the predetermined system setting value=e.g. "30 sec.", and the response message 808 including the transmission period="24 sec." is transmitted to the mobile node.

The mobile node transmits the BU packet (binding renewal message) to the home agent 100b at the transmission period="24 sec.".

The home agent 100b returns to the operation of FIG. 6, and repeats the operation of FIG. 6→FIG. 8→FIG. 9, thereby suppressing the load state by the calculation of the binding renewal message transmission period.

Accordingly, when the CPU usage rate is reduced, it becomes possible for the home agent 100b to restore the transmission period of the binding renewal message to a usual specified value for the mobile node which transmits the binding renewal message.

Embodiment (3)

Determination of Transmission Period Based on Line Usage Rate

Figure 10:
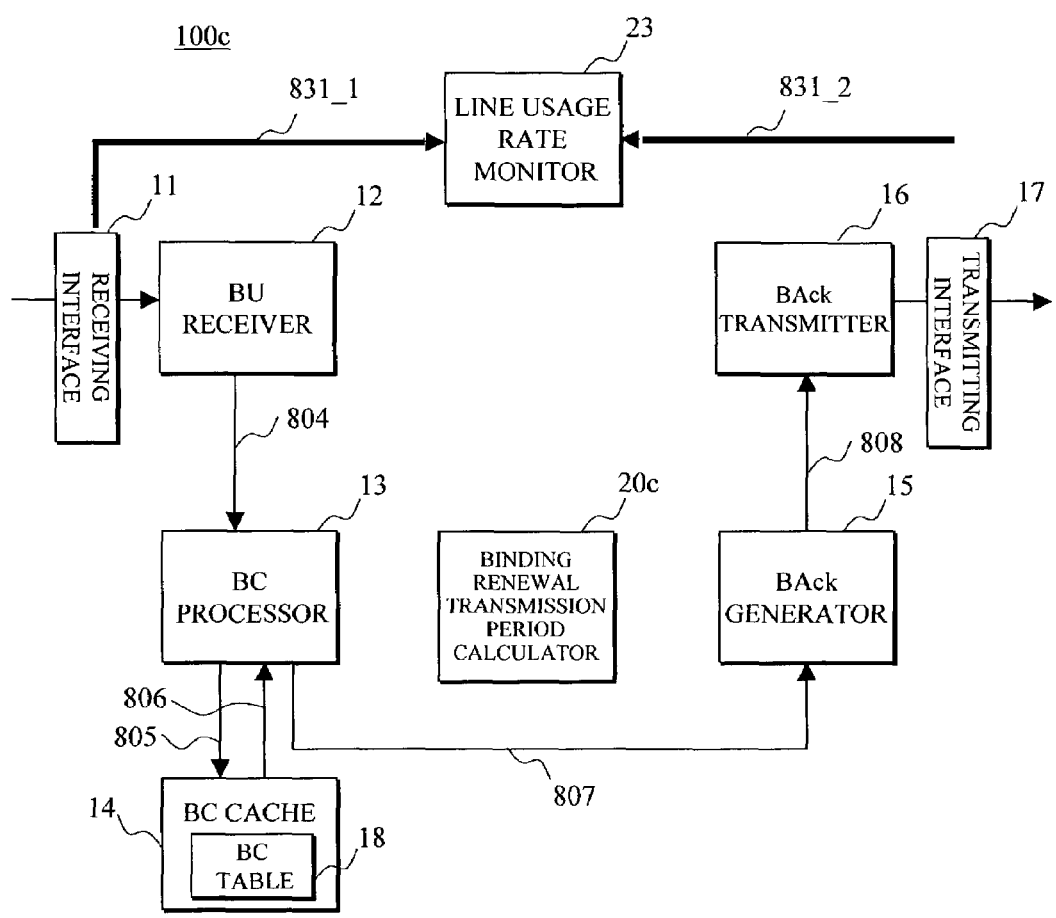
FIG. 10 is a block diagram showing an arrangement of an embodiment (3) of a home agent according to the present invention and an operation in a case where "line usage rate"<"threshold value"

FIG. 10 shows an arrangement of an embodiment (3) of a home agent 100c according to the present invention, and signals transmitted/received between functional portions of the home agent 100c in case "line usage rate"<"predetermined threshold value", where connecting lines between the functional portions are omitted.

In the embodiment (3), the home agent 100c determines the transmission period of the binding renewal message based on the line usage rate by the BU packet reception processing, and notifies the transmission period to the mobile node.

It is to be noted that the transmission period may be determined based on the line usage rate given by the reception processing only of the binding renewal message among the BU packets, instead of the BU packet reception processing.

The home agent 100c is different from the home agent 100a in the embodiment (1) in that a line usage rate monitor 23 is provided for monitoring a BU line usage rate monitor signal 831_1 and a BAck line usage rate monitor signal 831_2 of a receiving interface 11 and a transmitting interface 17 instead of the BC number monitor 21 which monitors the BC number.

Also, the home agent 100c is different from the home agent 100a in that a binding renewal transmission period calculator 20c is provided for calculating the transmission period based on the line usage rate, instead of the calculator 20a for calculating the transmission period based on the BC number.

The embodiment (1) in FIG. 1 only shows how the specifications of the receiving interface and the transmitting interface are prescribed, but does not show functional blocks of the receiving interface 11 and the transmitting interface 17 shown in FIG. 10, for the convenience sake.

Figure 11:
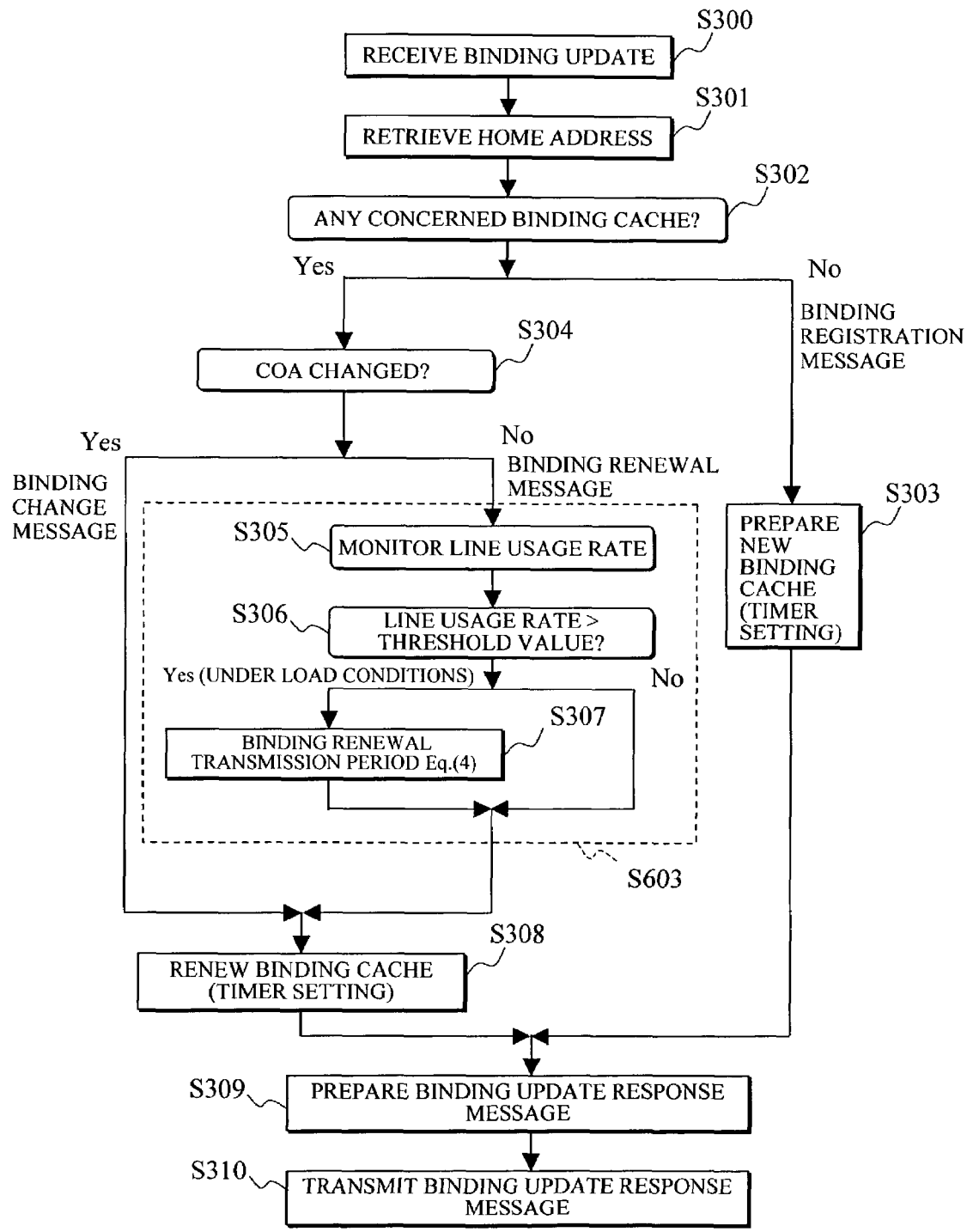
FIG. 11 is a flow chart showing an operation sequence in an embodiment (3) of a home agent according to the present invention.

FIG. 11 shows an operation sequence of the embodiment (3). The basic operation of this embodiment (3) is the same as that of the embodiment (1) except that the transmission period of the binding renewal message is determined based on the line usage rate instead of the BC number.

Figure 12:
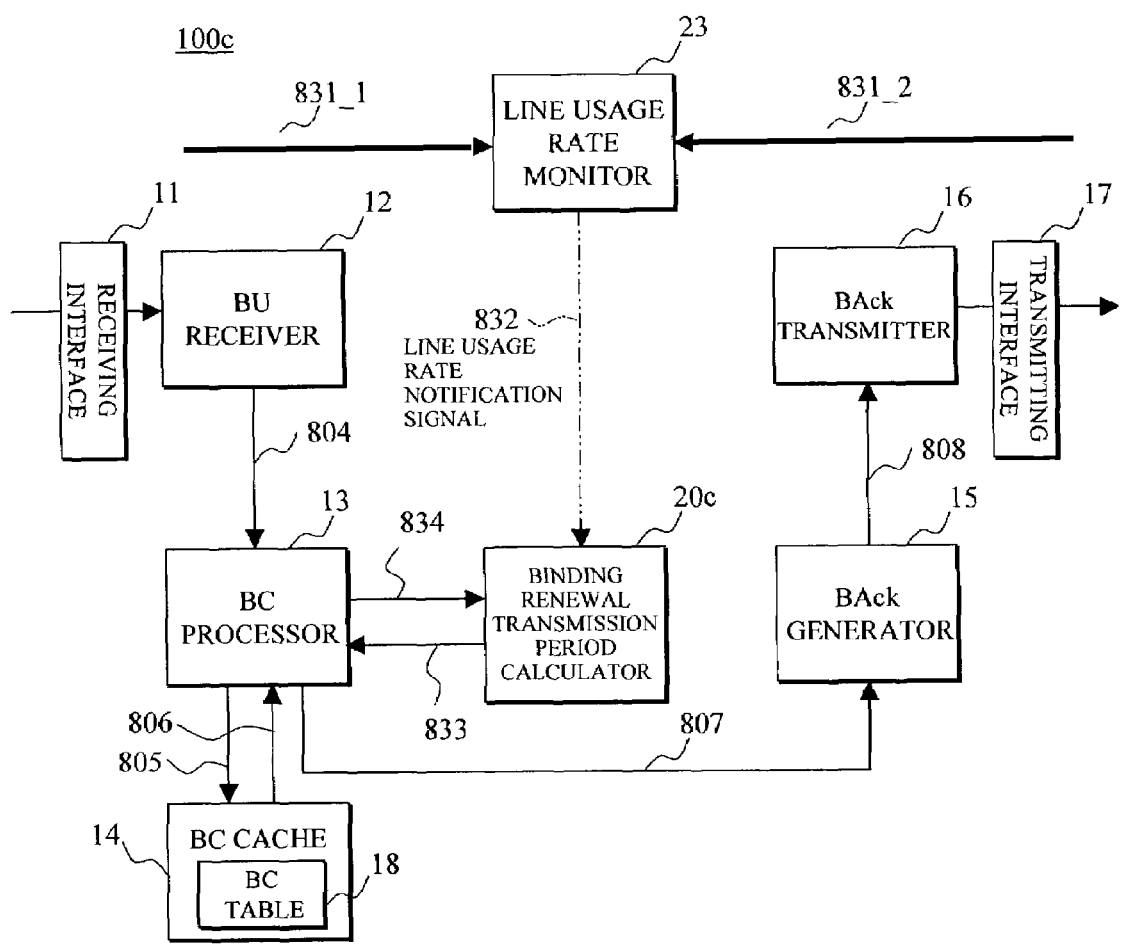
FIG. 12 is a block diagram showing an operation in a case where "line usage rate">"threshold value" in an embodiment (3) of a home agent according to the present invention.
Figure 13:
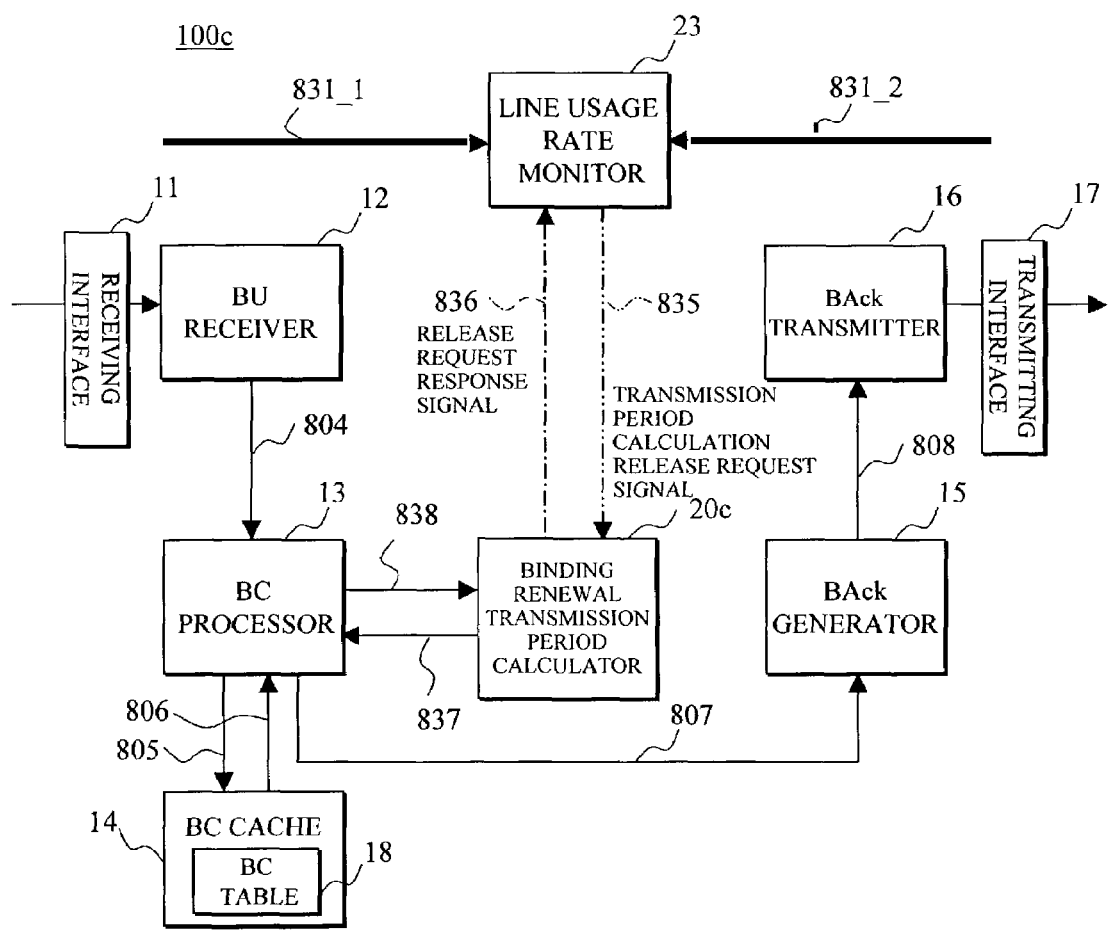
FIG. 13 is a block diagram showing an operation when a state has returned to a case where "line usage rate"<"threshold value" in an embodiment (3) of a home agent according to the present invention.

FIGS. 12 and 13 respectively show an operation in the case where "line usage rate">"predetermined threshold value" and an operation when the state has returned to a case where "line usage rate"<"threshold value".

The operation sequence of FIG. 11 will now be described referring to FIGS. 10, 12, and 13.

First, the case where the BU packet 804 is a binding registration message in FIG. 10 will now be described.

Steps S300-S303, S309, S310: The basic operation is the same as steps of S100-S103, S109, and S110 in the embodiment (1).

The receiving interface 11 receives the BU packet, and the transmitting interface 17 transmits the response message for this packet. The line usage rate monitor 23 monitors the then line usage rate monitor signals 831_1 and 831_2.

The home agent 100c registers the BC (e.g. lifetime a predetermined system setting value "30 sec.") of the source mobile node of the binding registration message in the BC table 18. Furthermore, the home agent 100c returns the response message including e.g. the transmission period="24 sec." to the mobile node.

Hereinafter, the case where the BU packet is the binding change message will be described referring to FIG. 10.

Steps S302, S304, and S308-S310: The basic operation is the same as that of the steps S102, S104, and S108-S110 in the embodiment (1). The home agent 100c determines that the BU packet is the binding change message. The home agent 100c renews the lifetime of the BC corresponding to the source mobile node of the packet registered in the BC table 18 to the predetermined system setting value="30 sec.".

Furthermore, the home agent 100c returns the response message including the transmission period="24 sec." to the mobile node.

The case where the BU packet is the binding renewal message will now be described referring to FIG. 12.

Steps S304-S307: FIG. 12 shows an operation of the home agent 100c in case "line usage rate">"threshold value". This "threshold value" is set by a manager.

The line usage rate monitor 23 monitors the BU line usage rate monitor signal 831_1 from the receiving interface 11 and the BAck line usage rate monitor signal 831_2 from the transmitting interface 17 to detect that "line usage rate">"predetermined threshold value".

The line usage rate monitor 23 notifies the "line usage rate" to the binding renewal transmission period calculator 20c with a line usage rate notification signal 832 to start the calculator 20c. On the other hand, every time the BC is renewed, the BC processor 13 notifies that the BC is in the renewal state to the calculator 20c with a signal 834. The calculator 20c calculates the transmission period of the binding renewal message based on the following Equation (4) triggered by the reception of the signal 834.

$$\text{Transmission period} = \text{Default value} \times \frac{1}{1 - \text{line usage rate}/100} \quad \text{Eq. (4)}$$

The line usage rate in Eq.(4) is expressed in %.

Steps S308-S310: The calculator 20c provides the calculated "transmission period" to the BC processor 13 with a signal 833. In the same way as steps S108-S110 of the embodiment (1), this transmission period is weighted and registered in the BC table 18, the timer of the BC is renewed, and the transmission period is notified to the mobile node with the response message 808.

The sequence when the operation has returned to the case where "line usage rate"<"threshold value" will now be described referring to FIG. 13.

Steps S304-S306 and S308-S310: When detecting that "line usage rate"<"threshold value", the line usage rate monitor 23 provides a transmission period calculation release request signal 835 to the binding renewal transmission period calculator 20c.

This calculator 20c stops the calculation of the transmission period of the binding renewal message and returns a release request response signal 836 to the monitor 23. Furthermore, the calculator 20c notifies that the transmission period calculation is stopped with a calculation stop notification signal 837 to the BC processor 13, which returns a response signal 838.

Hereafter, the home agent 100c returns to the operation sequence of FIG. 10, and repeats the operation of FIG. 10→FIG. 12→FIG. 13, thereby suppressing the load state by the calculation of the binding renewal message transmission period.

Embodiment (4)

Determination of Transmission Period Based on Priority of Mobile Node

In this embodiment (4), a home agent 100d determines the transmission period transmitted from the node based on the priority of the node.

Figure 14:
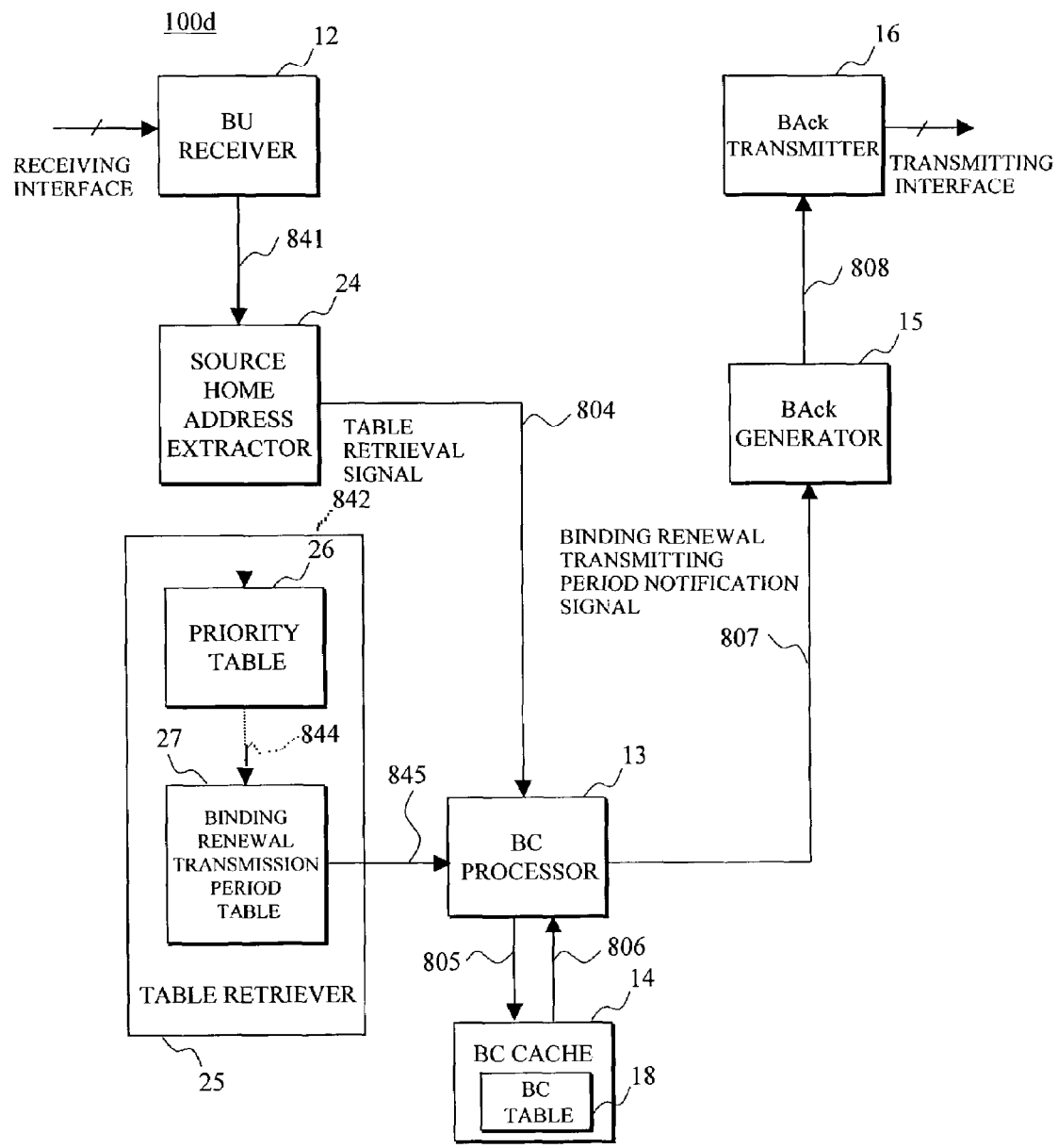
FIG. 14 is a block diagram showing an operation in a case where an entry of a mobile node is made into a priority table in an embodiment (4) of a home agent according to the present invention.

FIG. 14 shows an arrangement of the embodiment (4) of the home agent 100d according to the present invention, and signals transmitted/received between functional blocks of the home agent 100d in the case where an entry of the source mobile node of the BU packet is made into a priority table 26.

The home agent 100d of the embodiment (4) is different from the home agent 100a of the embodiment (1) in that a source home address extractor 24, instead of the BC number monitor 21, is connected between the BU receiver 12 and the BC processor 13, and a table retriever 25 is connected between the extractor 24 and the BC processor 13. This table retriever 25 includes the priority table 26 and a binding renewal transmission period table 27.

FIGS. 15A and 15B respectively show the priority table 26 and the binding renewal transmission period table 27. The table 26 is composed of the home address field and a priority field of each node. The table 27 is composed of the priority field and a binding renewal message transmission period field. The tables 26 and 27 are respectively preset by a network manager.

The priority field of the table 26 is linked to that of the table 27. For example, as for the transmission period of the binding renewal message of the mobile node having the home address "HA_1", the priority "1" is first retrieved from the table 26 with the "HA_1" being made a key, and then "30 sec." can be retrieved from the table 27 with the priority "1" being made a key.

Figure 16:
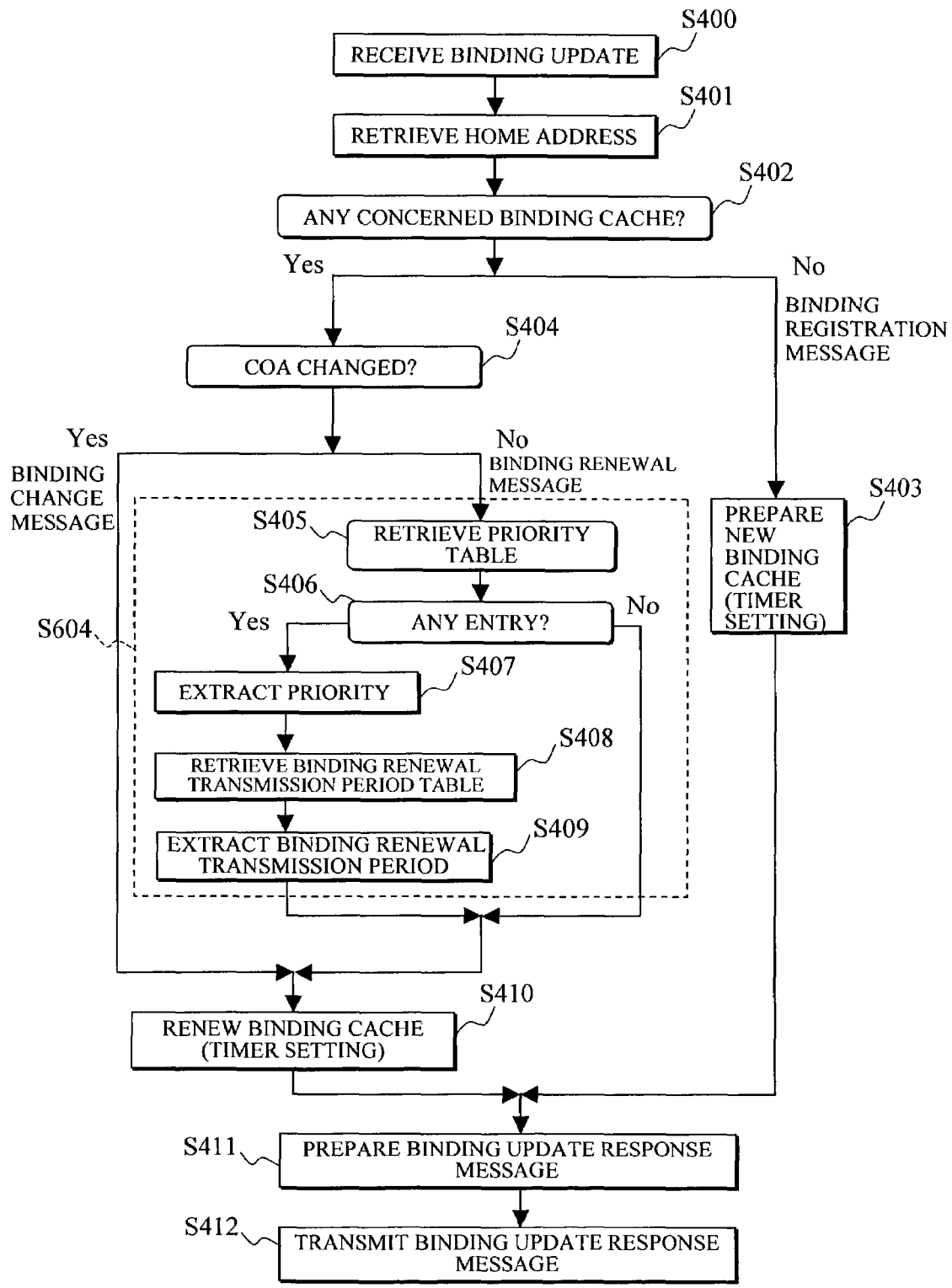
FIG. 16 is a flow chart showing an operation sequence in an embodiment (4) of a home agent according to the present invention.

FIG. 16 shows an operation sequence of the embodiment (4). The basic operation of the embodiment (4) is the same as that of the embodiment (1) except that the transmission period is determined by the priority of the mobile node instead of the BC number.

Steps S400-S403, S411, and S412: These steps show an operation sequence in the case where the BU packet is a binding registration message. This operation sequence is the same as that of steps S100-S103, S109, and S110 of the embodiment (1).

Steps S402, S404, and S410-S412: These steps show an operation sequence in the case where the BU packet is a binding change message. This operation sequence is the same as that of steps S102, S104, S108-S110 of the embodiment (1).

Steps S402, S404, and S406: These steps show an operation sequence in the case where the BU packet is a binding renewal message.

Steps S407-S412: In FIG. 14, the source home address extractor 24 extracts the home address of the source mobile node, e.g. "HA_1" from a BU packet 841, and provides a table retrieval signal 842 including the home address "HA_1" to the table retriever 25.

The table retriever 25 retrieves the priority table 26 with a key "HA_1", and extracts a priority "1" corresponding to the "HA_1" whose entry has been made. Furthermore, the table retriever 25 retrieves the binding renewal transmission period table 27, and extracts the transmission period "30 sec." corresponding to the priority="1" to be provided to the BC processor 13 with a signal 845.

Hereafter, the BC processor 13 assigns weights to the transmission period "30 sec.", renews the lifetime (timer) of the BC stored in the BC cache 14, and notifies the transmission period "30 sec." to the BAck generator 15. The BAck generator 15 generates the response message 808 including the transmission period "30 sec.", and the BAck transmitter 16 transmits the response message 808.

Figure 17:
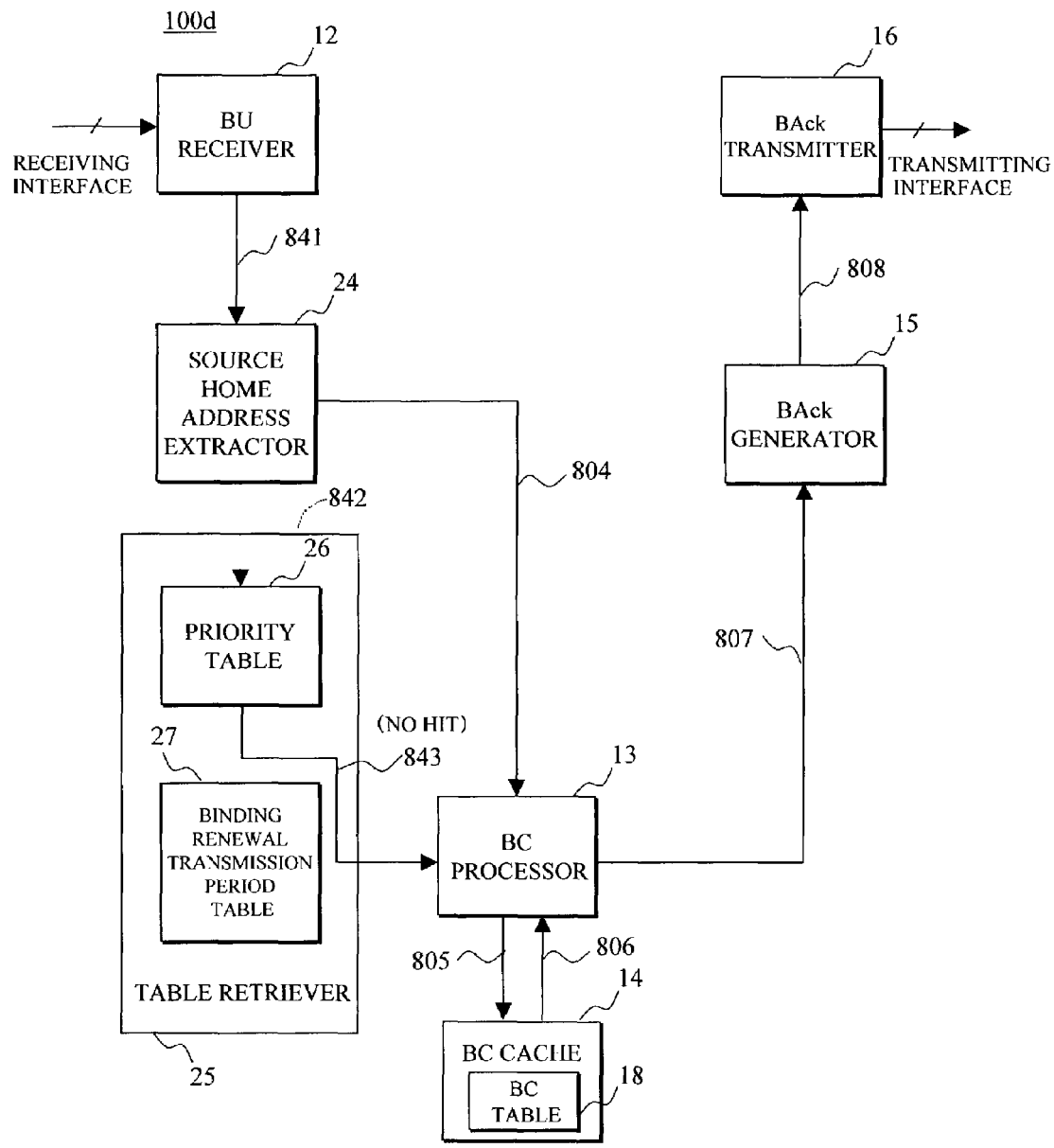
FIG. 17 is a block diagram showing an operation in a case where an entry of a mobile node is not made into a priority table in an embodiment (4) of a home agent according to the present invention.

Steps S405, S406, and S410: FIG. 17 shows the case where the entry of the "HA_1" is not made into the priority table 26. The table retriever 25 notifies the "HA_1" being not hit to the BC processor 13 with a signal 843.

The BC processor 13 renews the BC by the lifetime corresponding to the transmission period of the system setting value. The response message including the transmission period is transmitted to the mobile node.

Embodiment (5)

Figure 18:
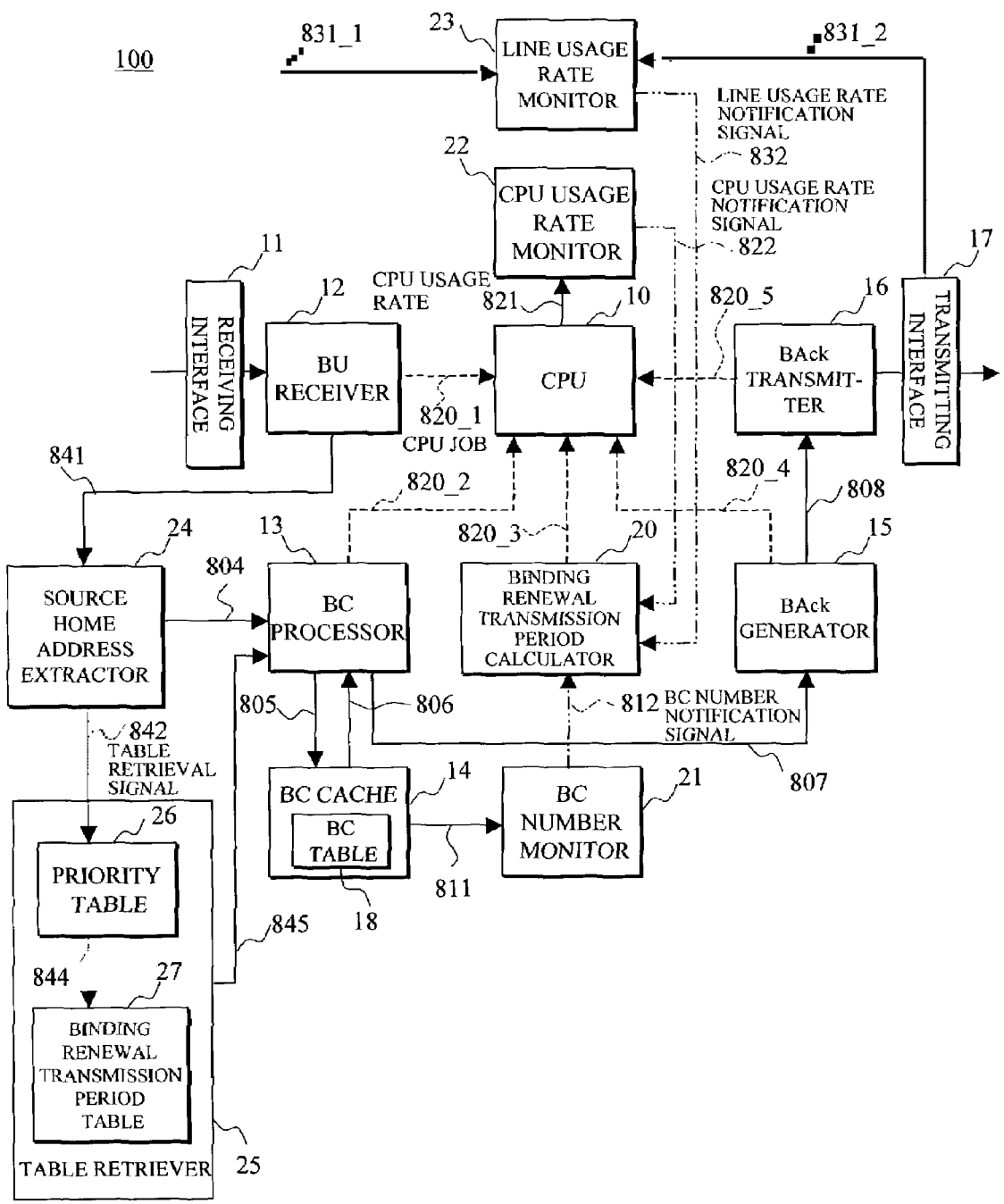
FIG. 18 is a block diagram showing an arrangement of an embodiment (5) of a home agent according to the present invention and an operation in a case where an entry of a mobile node is made into a priority table.

Determination of Transmission Period Based on BC Number, CPU Usage Rate, Line Usage Rate, and Priority of Mobile Node FIG. 18 shows an embodiment (5) of a home agent 100 according to the present invention. This home agent 100 is provided with the BC number monitor 21, the CPU usage rate monitor 22, the line usage rate monitor 23, and the table retriever 25 with which the home agents of the embodiment (1) in FIG. 1, the embodiment (2) in FIG. 6, the embodiment (3) in FIG. 10, and the embodiment (4) in FIG. 14 are respectively provided.

Also, the home agent 100 is provided with a binding renewal transmission period calculator 20 instead of the calculators 20a-20c with which the embodiments (1)-(3) are respectively provided.

Figure 19:
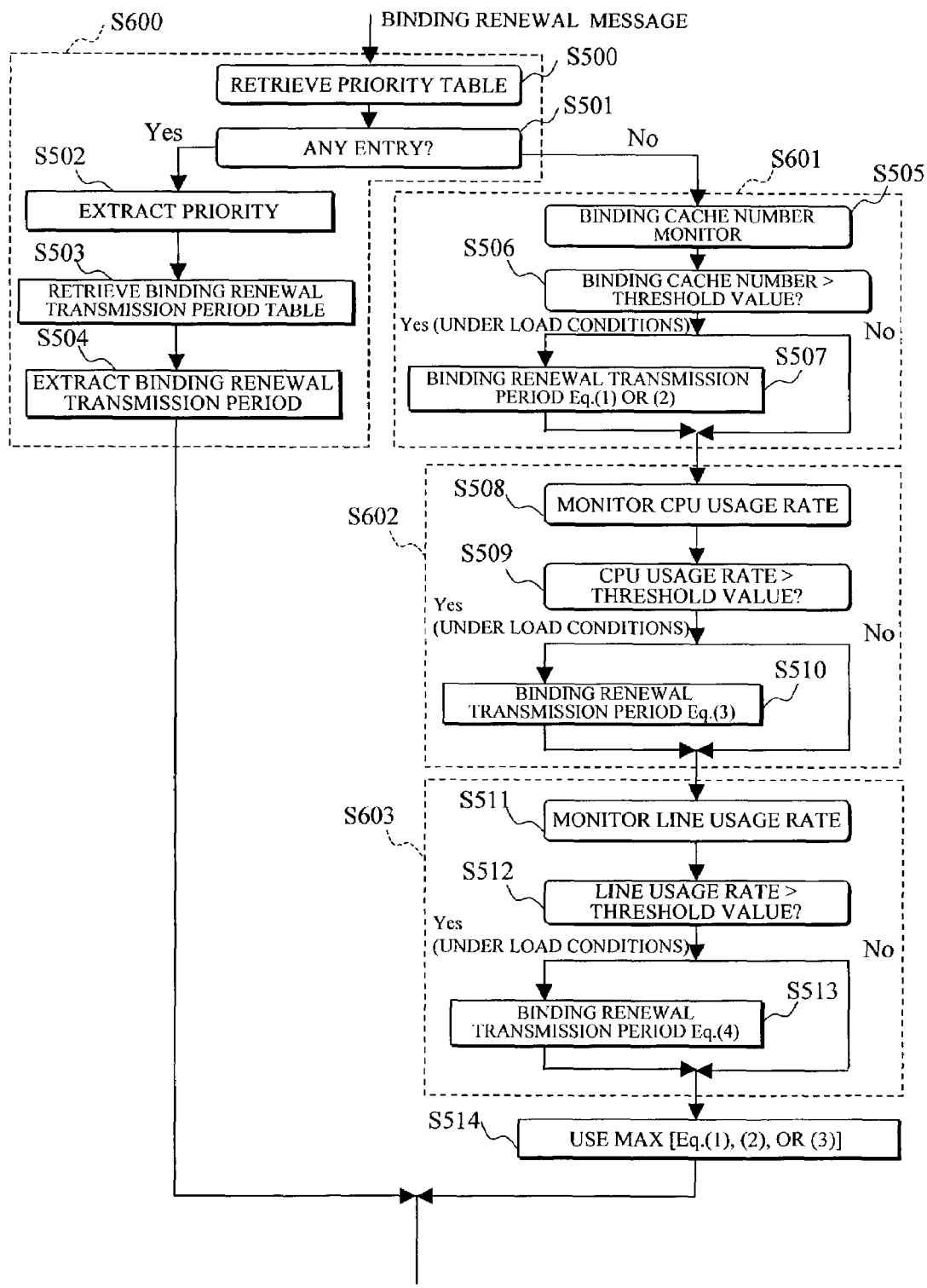
FIG. 19 is a flow chart showing an operation sequence in an embodiment (5) of a home agent according to the present invention.

FIG. 19 shows an example of an operation sequence in the embodiment (5). This operation sequence example especially shows the case where the BU packet is the binding renewal message. The operation in the case where the BU packet is the binding registration message or the binding change message is respectively the same as that of steps S100-S103, S109, S110, S100, or that of steps S100-S104, S108-S110 in the embodiment of FIG. 3.

The operation for determining the transmission period in the embodiment (5) will now be described referring to the operation sequences shown in the embodiment (1) of FIG. 3, the embodiment (2) of FIG. 7, the embodiment (3) of FIG. 11, and the embodiment (4) of FIG. 16.

Steps S500-S504 (step S600 shown by dashed lines): These steps are the same as steps S405-S409 (step S604 shown by dashed lines) of the embodiment (4) of FIG. 16. The transmission period is determined based on the priority of the mobile node.

Steps S505-S507 (step S601 shown by dashed lines): When the entry of the home address of the mobile node is not made into the priority table 26 at step S501, this operation sequence is performed. This operation sequence is the same as steps S105-S107 (step S601 shown by dashed lines) of the embodiment (1) of FIG. 3, and the transmission period is determined based on the BC number registered in the BC table 18.

Steps S508-S510 (step S602 shown by dashed lines): These steps are the same as steps S205-S207 (step S602 shown by dashed lines) of the embodiment (2) in FIG. 7, and the transmission period is determined based on the CPU usage rate.

Steps S511-S513 (step S603 shown by dashed lines): These steps are the same as steps S305-S307 (step S603 shown by dashed lines) of the embodiment (3) in FIG. 11, and the transmission period is determined based on the line usage rate.

Step S514: The maximum transmission period among ones determined at steps S507, S510, and S513 is adopted. In case "BC number"<"threshold value" at step S506, "CPU usage rate"<"threshold value" at step S509, and "line usage rate"<"threshold value" at step S512, the system specified value is adopted as the transmission period.

FIG. 18 mentioned above also shows an operation of steps S500-514. Since acquiring the transmission period corresponding to the home address of the mobile node whose entry is made into the priority table 26, the BC processor 13 does not request the transmission period from the calculator 20.

Figure 20:
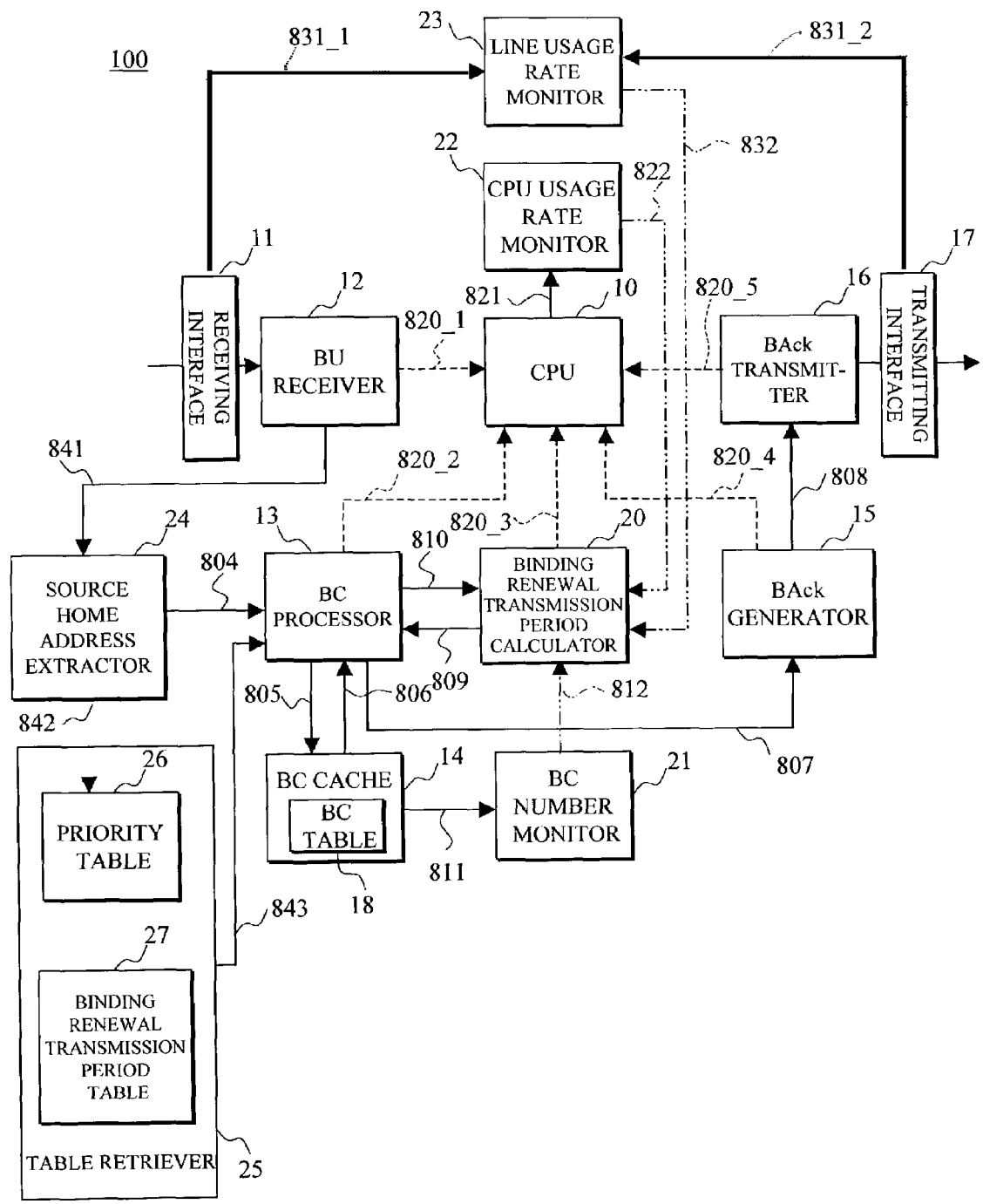
FIG. 20 is a block diagram showing an operation in a case where an entry of a mobile node is not made into a priority table in an embodiment (5) of a home agent according to the present invention.
Figure 21:
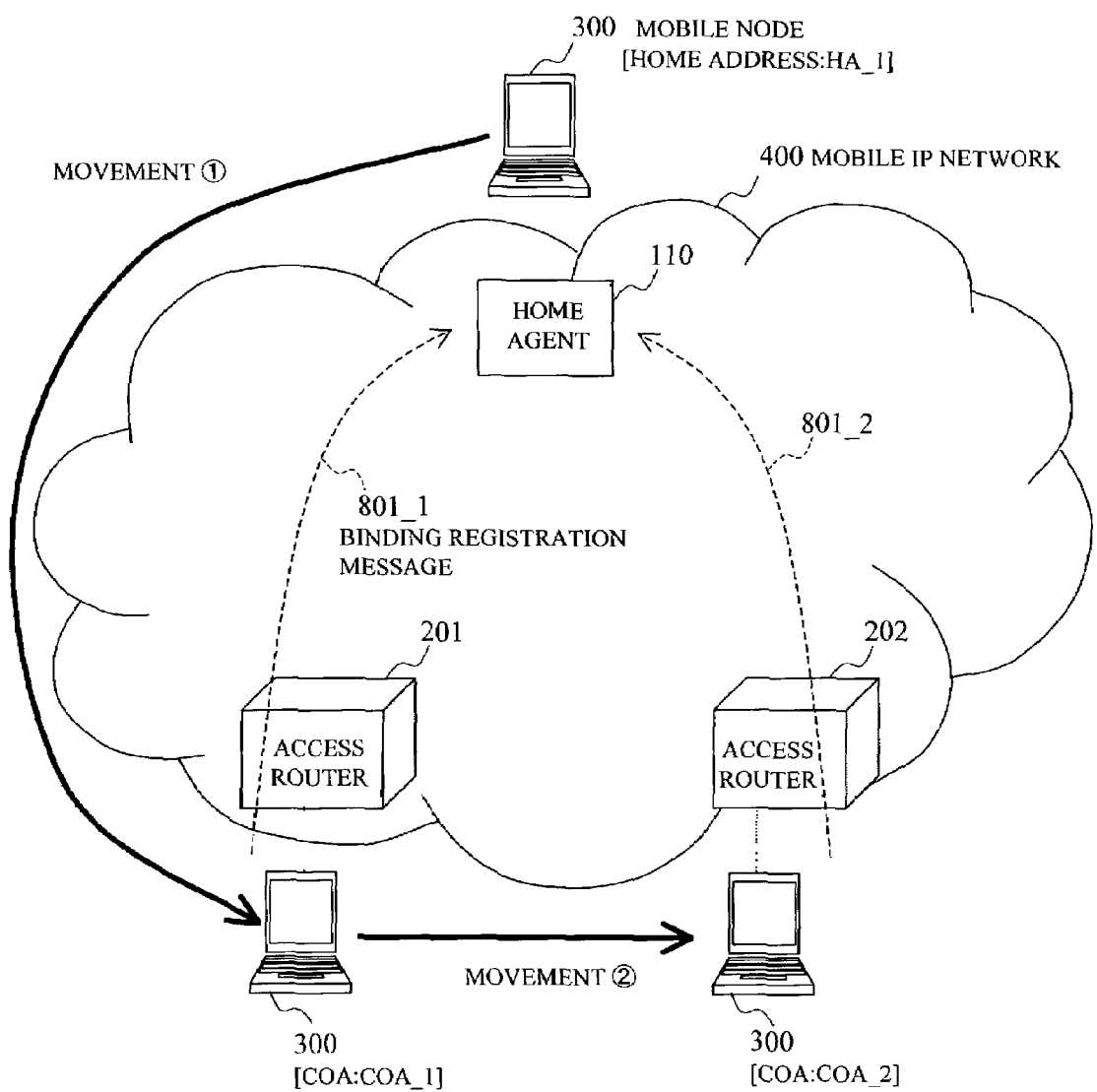
FIG. 21 is a block diagram showing a binding registration in a general mobile IP network.

FIG. 20 shows an operation of steps S505-514. Namely, since the entry of the home address (identifier) of the node is not made into the priority table 26, and the BC processor 13 can not acquire the transmission period of the binding renewal message upon the table retrieval, the BC processor 13 requests the transmission period of the binding renewal message from the calculator 20 with a signal 810 upon renewing the BC.

The calculator 20 returns the value of the maximum transmission period among ones calculated based on the BC number, the CPU usage rate, and the line usage rate to the BC processor 13 with a signal 809.

As described above, a home agent according to the present invention is arranged such that a central processing monitor detects a usage rate of a CPU for processing accompanied by a reception of a binding update packet from a mobile node or a binding renewal message among the binding update packets, a line usage rate monitor detects a line usage rate of a receiving interface accompanied by the reception processing or a transmitting interface, a BC number monitor detects a binding cache number, and a calculator calculates a transmission period of the binding renewal message of the mobile node based on thus detected CPU usage rate, line usage rate, binding cache number, and a priority table of the mobile node. Therefore, processing load of the binding renewal message in the home agent and the number of binding renewal messages in the mobile network are reduced.

What we claim is:

1. A home agent comprising:
one or more functional portions of:
a central processing unit for performing processing accompanied by a reception of a binding update packet from a mobile node, and a central processing monitor for detecting a usage rate of the central processing unit for the processing;
a receiving interface for receiving the binding update packet, a transmitting interface for transmitting a response message associated with the reception processing of the binding update packet, and a line usage rate monitor for detecting a line usage rate of at least one of the receiving interface and the transmitting interface, and a priority table associating a priority of the mobile node with a transmission period of a binding renewal message transmitted from the mobile node;
a binding cache processor for renewing a binding cache associating a home address of the mobile node with a care-of address of a moving destination of the mobile node in absence of a change of a care-of address included in the binding update packet;
a binding renewal transmission period calculator for determining the transmission period of the binding renewal message transmitted by the mobile node based on at least two or more information of a binding cache number, the usage rate of the central processing unit, the line usage rate, and the priority; and
a transmitter for transmitting the transmission period to the mobile node of the care-of address included in the received packet.

* * * * *